US010187368B2

(12) United States Patent
Way

(10) Patent No.: US 10,187,368 B2
(45) Date of Patent: Jan. 22, 2019

(54) RESOURCE TRANSFER SETUP AND VERIFICATION

(71) Applicant: Ripple Luxembourg S.A., Luxembourg (LU)

(72) Inventor: Robert Way, Spring, TX (US)

(73) Assignee: Ripple Luxembourg S.A., Luxembourg (LU)

( * ) Notice: Subject to any disclaimer, the term of this patent is extended or adjusted under 35 U.S.C. 154(b) by 198 days.

(21) Appl. No.: 15/227,437

(22) Filed: Aug. 3, 2016

(65) Prior Publication Data

US 2018/0041486 A1 Feb. 8, 2018

(51) Int. Cl.
*H04L 29/06* (2006.01)
*H04L 29/08* (2006.01)
*G06F 9/54* (2006.01)
*G06Q 40/04* (2012.01)

(52) U.S. Cl.
CPC .............. *H04L 63/08* (2013.01); *G06F 9/546* (2013.01); *G06Q 40/04* (2013.01); *H04L 67/02* (2013.01)

(58) Field of Classification Search
CPC ... H04L 63/08; H04L 67/02; H04L 2463/102; G06F 21/30; G06Q 20/381; G06Q 20/3678
See application file for complete search history.

(56) References Cited

U.S. PATENT DOCUMENTS

| 5,231,666 | A | * | 7/1993 | Matyas | G06F 9/30003 705/66 |
| 8,626,617 | B1 | * | 1/2014 | Bhatt | G06Q 40/12 705/30 |
| 9,721,235 | B2 | * | 8/2017 | Wilkes | G06Q 20/02 |
| 2013/0218763 | A1 | * | 8/2013 | Wilkes | G06Q 30/0241 705/40 |
| 2014/0188738 | A1 | * | 7/2014 | Huxham | H04L 63/10 705/73 |

(Continued)

FOREIGN PATENT DOCUMENTS

AU 783008 B2 9/2005

OTHER PUBLICATIONS

International Search Report and Written Opinion dated Nov. 6, 2017 as received in Application No. PCT/EP2017/069631.

*Primary Examiner* — Shanto Abedin
(74) *Attorney, Agent, or Firm* — Morris & Kamlay LLP

(57) ABSTRACT

Systems and techniques are provided for a resource transfer setup and verification. A request for transfer conditions for a transfer of resources may be received from a first computing device. A set of transfer conditions may be generated in response to the request for transfer conditions and sent to the first computing device. The set of transfer conditions and an indication of an acceptance of the set of transfer conditions by a second computing device may be received from the first computing device. A transfer identifier for the set of transfer conditions may be generated from data from the set of transfer conditions which may specify a first sub-transfer. Transfer instructions may be sent to a third computing device, including instructions for a sub-transfer specified in the set of transfer conditions. The set of transfer conditions may be stored with the transfer identifier as a transfer record in non-volatile storage.

13 Claims, 15 Drawing Sheets

(56) References Cited

U.S. PATENT DOCUMENTS

2015/0332256 A1* 11/2015 Minor ................ G06Q 20/3678
                                                      705/69
2016/0297401 A1* 10/2016 Haga ..................... B60R 25/307
2017/0243213 A1*  8/2017 Castinado ............ G06Q 20/401

* cited by examiner

RESOURCE TRANSFER SETUP AND VERIFICATION

BACKGROUND

The transfer of resources between two parties may be performed with minimal communication between parties involved in the transfer prior to the transfer taking place. This may result in some parties not being informed that a transfer is taking place before the transfer has started. A transfer of resources that makes use of a publicly available system may result in private information about parties to a transfer of resources being exposed.

BRIEF SUMMARY

In an implementation, a request for transfer conditions for a transfer of resources from a sending party to a receiving party may be received from a first computing device. A set of transfer conditions may be generated in response to the request for transfer conditions. The set of transfer conditions may be sent to the first computing device. The set of transfer conditions and an indication of an acceptance of the set of transfer conditions by a second computing device may be received from the first computing device. A transfer identifier for the set of transfer conditions may be generated from data from the set of transfer conditions. The data may include data specifying a first sub-transfer. Transfer instructions may be sent to a third computing device. The transfer instructions may include instructions for a sub-transfer specified in the set of transfer conditions. The set of transfer conditions may be stored with the transfer identifier as a transfer record in non-volatile storage.

A request for transfer conditions for a transfer of resources from a sending party to a receiving party may be received from a first computing device. The request for transfer conditions may be sent to a second computing device. A set of transfer conditions may be received from a second computing device. The set of transfer conditions may be sent to the first computing device. The set of transfer conditions and an indication of an acceptance of the set of transfer conditions by the first computing device may be received from the first computing device. The set of transfer conditions and the indication of the acceptance by the first computing device may be sent to the second computing device. An indication of acceptance of the set of transfer conditions by the second computing device and a transfer identifier for the set of transfer conditions may be received from the second computing device. First transfer instructions may be sent to a third computing device. The first transfer instructions may include instructions for a first sub-transfer specified in the set of transfer conditions. Second transfer instructions and the transfer identifier may be sent to a fourth computing device. The second transfer instructions may include instructions for a second sub-transfer specified in the set of transfer conditions. The set of transfer conditions may be stored with the transfer identifier as a transfer record in non-volatile storage.

A transfer identifier may be sent to a first computing device. A partial transfer record may be received from the first computing device. The partial transfer record may include transfer instructions and a second transfer identifier that matches the transfer identifier. An identity of a computing device associated with a resource pool specified in the transfer instructions may be determined from the transfer instructions of the partial transfer record. The transfer identifier may be sent to the computing device for which an identity was determined. A transfer record may be received from the computing device. The transfer record may include a set of transfer conditions and a third transfer identifier that matches the transfer identifier.

Systems and techniques disclosed herein may allow for resource transfer setup and verification. Additional features, advantages, and embodiments of the disclosed subject matter may be set forth or apparent from consideration of the following detailed description, drawings, and claims. Moreover, it is to be understood that both the foregoing summary and the following detailed description are examples and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

DETAILED DESCRIPTION

Figure 1:
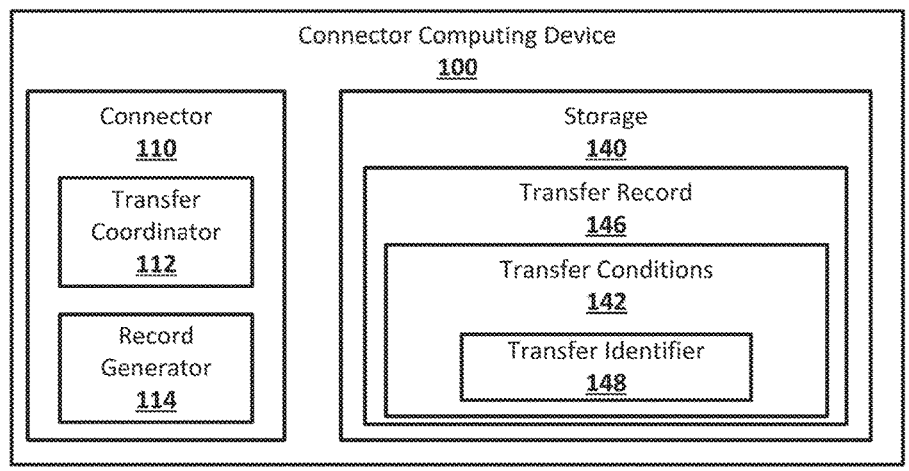
FIG. 1 shows an example system suitable for resource transfer setup and verification according to an implementation of the disclosed subject matter.

According to embodiments disclosed herein, resource transfer setup and verification may allow for a transfer of resources between parties to be set up and confirmed through communication between the systems and computing devices involved in the transfer of resources before the transfer of resource occurs. Resource transfer setup and verification may also allow a record of a transfer of resources to be identified by a transfer identifier, which may be used to determine the conditions of a transfer of resource for which the transfer identifier is known, and to verify that a record of a transfer of resources is original and has not been tampered with. A sending party may initiate a transfer of resources to a receiving party, using any suitable computing device. The transfer may be performed using resource tracking systems, which may be any suitable computing devices for tracking the ownership of resources by the various parties. A transfer chain for a transfer of resource may include a number of resource tracking system which may be used in the transfer of resources.

A party, such as, for example, a sending party, intermediary party, or receiving party, may control a resource pool on a resource tracking system. A resource tracking system may be any suitable computing device or system, with any suitable combination of hardware and software, such as, for example, a system run by a financial institution, a hardware or software component of a server system or computing device, or a distributed system, such as, for example, a cryptocurrency ledger or blockchain which may exist on a number of different computing devices and be reconciled in a collaborative fashion, or may be centralized. For example, the resource tracking system be a server system or other computing system that tracks a ledger for a branch of a bank, and may track the control of all accounts opened at that branch. A resource tracking system may track the control of resources for any number of parties. A party, such as, for example, a sending party, intermediary party, or receiving party, may control a resource pool on a resource tracking system. The resource pool for a party on a resource tracking system may include an identification of the party and quantities of each type of resource controlled by the party and tracked by the resource tracking system. A party may have more than one resource type tracked by an individual resource tracking system For example, a resource tracking system that includes a blockchain for a cryptocurrency may include a resource pool for each party, for example, individual or organization, which owns some quantity of the cryptocurrency. The resource pool may identify the owner of the cryptocurrency, for example, using a cryptographic public key stored with the resource pool, rendering the cryptocurrency accessible only to a party with the corresponding private key. The resource pool may also include the quantity of cryptocurrency. A resource tracking system for a financial institution may include a ledger, for example, hosted on a server system. The resource pools may be accounts owned by account holders at the financial institution, and may track the various assets owned by the account holder and tracked by the financial institution. For example, a resource pool for a party may include a type and quantity of one or more currencies and types and quantities of other types of assets, such as stocks, bonds, certificates of deposit, and the like. Alternatively or in addition, resource pools may include or record ownership of other resources, such as commodities or any resource that may be commoditized, finished physical goods, raw materials, computing resources, real property, or any other resource that may be owned by an entity and transferred from one entity to another. The account holder may be identified by any suitable information, and may need proof of identity, such as, for example, a username and password for the account, in order to access the account. A resource tracking system for a server system may be, for example, some suitable combination of hardware and software for tracking resources and ownership of those resources on the server system. For example, the resource tracking system for a server system may track computing resources such as storage space or processor time owned by various users of the server system, where the users may be physical individuals or organizations, or virtual users of a system, such as system accounts, or other processes running on the server system.

A resource tracking system may track any type of resource. For example, a resource may be a currency, cryptocurrency, financial instrument, commodity, or computational resource such as processor time, volatile and non-volatile storage space, and network bandwidth. The record of ownership and quantity of a resource by the resource tracking system may also be the resource itself, or may be a record of ownership of a resource that exists separately. For example, in a resource tracking system that is a blockchain for a cryptocurrency, the record of ownership for some quantity of the cryptocurrency may be the cryptocurrency. In a resource tracking system that tracks ownership of commodities, the record of ownership may correspond to physical resources, for example, gold, oil, or other commodities, that exist separately. Such resources may be transferred by transferring ownership, though the physical instantiation of the resource may not necessarily be moved.

A party, which may be a sending party, may initiate a transfer of resources by using a client computing device to send a request for transfer conditions to a connector computing device. The sending party may be any party that wishes to send, or transfer, resources under their control to some other party, for example, a receiving party. The client computing device may be used by, for example, any suitable person, group, organization, or computer hardware and software, and may be any suitable computing device or system. For example, the client computing device may be a suitable computing device such as a laptop, used by person to initiate a transfer of resources. The client computing device may be used by, for example, a person wishing to transfer currency to another person, business, or organization. The client computing device may be used by the sending party, or may be used on behalf of the sending party. For example, the sending party may be a person, and the client computing device may be a bank computer system, which may be used to initiate a transfer of resources on behalf of the sending party. The client computing device may also be, for example, a server system used by a server management system running on the server system. The client computing device may send the request for transfer conditions, for example, by sending communications over any suitable wired or wireless connection to the connector computing device. The connection may be a network connection, such as a WAN or LAN connection, or may be internal bus connection, for example, within a computing system.

The request for transfer conditions may include an intended receiving party for the transfer of resources, including the resource pool into which resources are to be transferred, or destination resource pool, the resource pool out of which resources will be transferred to start the transfer, or origin resource pool, the type of resource to be transferred out from the origin resource pool, or origin resource, the type of resource to be received in the destination resource pool, or destination resource, which may be the same type as, or a different type from, the origin resource, and the quantity of resources to be received in the destination resource pool. The destination resource pool may be controlled by or otherwise associated with the receiving party, and the origin resource pool may be controlled by or otherwise associated with the sending party. The destination resource pool may be located on a different resource tracking system than the origin resource pool. The request for transfer conditions may include data in any suitable format. For example, the request for transfer conditions may indicate resource pools using Uniform Resource Identifiers (URIs). For example, a URI may specify an account on a bank ledger, or an account on a public ledger for a cryptocurrency.

For example, a sending party may wish to transfer money to a receiving party, and may have US dollars to transfer. The receiving party may expect to receive Euros. The sending party, when sending a request for transfer conditions, may specify that it will send out a quantity of US dollars, and the receiving party will receive some quantity of Euros based on exchange rates throughout the transfer and any fees that may be imposed on the transfer. The sending party may, alternatively, specify that the receiving party should receive some quantity of Euros, and the quote may include the quantity of US dollars the sending party will need to send out to ensure that the receiving receives the specified quantity of Euros, accounting for exchange rates and fees.

A connector computing device may receive the request for transfer conditions from the client computing device. The connector computing device may be any suitable computing device, and may be associated with the resource tracking system which includes the resource pool controlled by the sending party that used the client computing device to send the request for transfer conditions. For example, the resource pool controlled by the sending party may be an account on the ledger of a branch of a bank and the connector computing device may be computing device belonging to the bank. The connector computing device may be a suitable computing device such as a server, which may be controlled or associated with a person, organization, or institution that may be associate with a resource tracking system. For example, the connector computing device may be a server belonging to a bank or other financial institution. The connector computing device may include suitable hardware and software to implement a connector which may handle communication with the client computing device, other connector computing devices, and resource tracking systems. The client computing device may receive the request for transfer conditions, for example, over any suitable wired or wireless connection to the connector computing device. The connection may be a network connection, such as a WAN or LAN connection, or may be internal bus connection, for example, within a computing system.

The connector computing device may determine whether a destination resource pool, as indicated by a received request for transfer conditions, is included on a resource tracking system that is associated with the connector computing device. If the destination resource pool is not located on a resource tracking system that is associated with the connector computing device, the connector computing device may determine that an additional resource tracking system, associated with a different connector computing device, may be needed to complete the transfer chain, and the different connector computing device may need to be contacted to provide a response to the request. Otherwise, if the origin resource pool is located on a first resource tracking system and the destination resource pool is located on a second resource tracking system and there is a resource pool associated with the connector computing device on both the first resource tracking system and the second resource tracking system, no additional resource tracking systems may be needed for the transfer of resources. For example, the sending party may have an account on a ledger at a branch of the bank that is associated with the connector computing device. If the destination resource pool controlled by the receiving party is an account on a ledger of a different branch of the same bank, the connector computing device may determine that no additional resource tracking systems, or ledgers, will be needed to complete the transfer. If destination resource pool controlled by the receiving party is an account on a ledger at branch of a different bank, the connector computing device may determine that an additional resource tracking system will be needed to complete the transfer.

When no additional resource tracking systems are needed for the transfer of resources, the connector computing device may generate a set of transfer conditions without contacting any other connector computing devices. The set of transfer conditions may include any suitable conditions on a transfer of resources from the origin resource pool to the destination resource pool. For example, the set of transfer conditions may include identities of a number of resource tracking systems, and parties affiliated with the resource tracking systems, that may be used in the resource transfer, resource pools, and parties that control the resource pools, that may be used in the resource transfer, a quantity of the origin resource that the sending party may need to transfer out to ensure that the receiving party receives the appropriate quantity of the destination resource, any fee for the transfer, and any intermediate resource types and quantities that may be used in the transfer. The set of transfer conditions may include conditions for sub-transfers. The set of transfer conditions may also include any data provided in the request for transfer conditions that was sent by the client computing device. The set of transfer conditions may also include an expiration, which may set a time limit on how long the client computing device will have to accept the set of transfer conditions before they can no longer be accepted. The connector computing device may generate only a single set of transfer conditions. After being generated, the set of transfer conditions may be set to a "proposed" state, indicating that the set of transfer conditions has not yet been accepted to be used for the transfer of resources. An indication that the set of transfer conditions is in the "proposed" state may be stored as part of the set of transfer conditions. The set of transfer conditions may be stored in any suitable form, such as, for example, as a single data object, or multiple linked data objects, which may be created using, for example, JavaScript Object Notation (JSON), or any other suitable object for encapsulating data. The set of transfer conditions may be transmitted using any suitable protocol. For example, the set of transfer conditions may be transmitted between computing devices using HTTP.

The set of transfer conditions may include two separate sub-transfers when no additional resource tracking systems are needed for the transfer of resources. The first sub-transfer may be an origin sub-transfer, and may specify a transfer of the origin resource out of the origin resource pool on the resource tracking system that includes the origin resource pool. The origin resource may be transferred into a resource pool on the same resource tracking system, which may be a first intermediary resource pool. The first intermediary resource pool may be controlled by or associated with an intermediary party associated with the connector computing device. The second sub-transfer may be a destination sub-transfer, and may specify the transfer of the destination resource out of a second intermediary resource pool on a resource tracking system which includes the destination resource pool. The destination resource may be transferred into the destination resource pool. The second intermediary resource pool may be controlled by or associated with the same intermediary party as the first intermediary resource pool. Any intermediary resource pools may be specified in any suitable manner in the set of transfer conditions, such as, for example, through a URI. Any details about the intermediary resource pools, such as the identity of parties associated with the intermediary resource pools, may also be included in the set of transfer conditions. The conditions for both the first and second sub-transfer may be specified by the connector computing device based on the origin resource, origin resource pool, destination resource, and destination resource pool indicated in the request for transfer conditions.

For example, the set of transfer conditions may include an origin resource of US dollars and a destination resource of Euros. The origin resource pool may be an account on a ledger of a US branch of a bank. The destination resource pool may be an account on a ledger of a European branch of the same bank. The set of transfer conditions generated by the connector computing device may include a first sub-transfer and second sub-transfer. The first sub-transfer may specify a transfer of US dollars from the account that is the origin resource pool, for example, an account belonging to the sending party, to an account belonging to the bank on the ledger of the US branch of the bank. The second sub-transfer may specify a transfer of Euros from an account belonging to the bank on the ledger of the European branch of the bank to the account that is the destination resource pool. This may allow the sending party to send out US dollars while the receiving party receives Euros. The rate of exchange, and any additional fees, may be set by the bank in the set of transfer conditions sent to the client computing device in response to the request for transfer conditions.

When additional resource tracking systems are needed for the transfer of resources, the connector computing device may send the request for transfer conditions to any suitable number of additional connector computing devices. The additional connector computing devices may be associated with, or be associated with parties that control resource pools on, a resource tracking system that includes the destination resource pool. The additional connector computing devices may also be associated with parties that control resource pools included on additional resource tracking systems. An additional resource tracking system may include a resource pool associated with the connector computing device that received the request for transfer conditions from the client computing device, or first connector computing device, and a resource pool associated with an additional, or second, connector computing device. For example, the destination resource pool may be an account on ledger at a branch of a first bank. The first connector computing device may be associated with a second bank which may not have an account on the ledger at the branch of the first bank. The additional connector computing devices may be associated with other financial institutions, each of which may have an account on the same ledger with the destination resource pool at the branch of the first bank. The other financial institutions may include, for example, the first bank, other banks which have accounts on the ledger at the branch of the first bank, payment processors, currency exchangers, and other institutions that offer financial or payment services. The financial institutions may also have accounts on additional resource tracking systems on which the second bank, associated with the first connector computing device, has an account. This may allow for transfers between the other financial institutions and the second bank on the additional resource tracking systems. The additional resource tracking system, and a resource pool on the additional resource tracking system controlled by or associated with an intermediary party associated with the connector computing device may be specified by the connector computing device when sending the request for transfer conditions to the additional connector computing devices. For example, the connector computing device may add a URI for such a resource pool to the request for transfer conditions before sending the request for transfer conditions to additional connector computing devices. The request for transfer conditions may specify a different additional resource tracking system for different additional connector computing devices. For example, the additional resource tracking system specified in a request for transfer conditions sent to a first additional connector computing device may be a public ledger for a cryptocurrency, while the additional resource tracking system specified in an otherwise identical request for transfer conditions sent to a second additional connector computing device may be foreign exchange market.

An additional connector computing device that receives the request for transfer conditions may generate a set of transfer conditions. The set of transfer conditions may include any suitable conditions on a transfer of resources from the origin resource pool to the destination resource pool. For example, the set of transfer conditions may include identities for a number of resource tracking systems, including the additional resource tracking system, and parties affiliated with the resource tracking systems, that may be used in the resource transfer, resource pools, including resource pools on the additional resource tracking system, and parties that control the resource pools, that may be used in the resource transfer, a quantity of the origin resource that the sending party may need to transfer out to ensure that the receiving party receives the appropriate quantity of the destination resource, any fee for the transfer, and any intermediate resource types and quantities that may be used in the transfer. The set of transfer conditions may include the conditions for sub-transfers. The set of transfer conditions may also include any data provided in the request for transfer conditions that was sent by the client computing device. The set of transfer conditions may also include an expiration, which may set a time limit on how long the client computing device will have to accept the set of transfer conditions before they can no longer be accepted. The additional connector computing device may generate only a single set of transfer conditions. After being generated, the set of transfer conditions may be set to a "proposed" state, indicating that the set of transfer conditions has not yet been accepted to be used for the transfer of resources. An indication that the set of transfer conditions is in the "proposed" state may be stored as part of the set of transfer conditions. The set of transfer conditions may be stored in any suitable form, such as, for example, as a single data object, or multiple linked data objects, which may be created using, for example, JavaScript Object Notation (JSON), or any other suitable object for encapsulating data. The additional connector computing devices that generate sets of transfer conditions based on the received request for transfer conditions may send these sets of transfer conditions to the connector computing device which sent the request. The sets of transfer conditions may be transmitted using any suitable protocol. For example, the sets of transfer conditions may be transmitted between computing devices using HTTP.

The set of transfer conditions may include three separate sub-transfers when an additional resource tracking system is needed for the transfer of resources. The first sub-transfer may be an origin sub-transfer, and may specify a transfer of the origin resource out of the origin resource pool on the resource tracking system that includes the origin resource pool. The origin resource may be transferred into a resource pool on the same resource tracking system, which may be a first intermediary resource pool. The first intermediary resource pool may be controlled by or associated with an intermediary party associated with the first connector computing device. The second sub-transfer may be an intermediate sub-transfer, and may specify a transfer of an intermediate resource out of second intermediary resource pool on the additional resource tracking system. The intermediate resource may be transferred into a resource pool on the same additional resource tracking system, which may be a third intermediary resource pool. The third intermediary resource pool may be controlled by or associated with an intermediary party associated with the second connector computing device. The third sub-transfer may be destination sub-transfer, and may specify the transfer of the destination resource out of a fourth intermediary resource pool on a resource tracking system which includes the destination resource pool. The destination resource may be transferred into the destination resource pool. The fourth intermediary resource pool may be controlled by or associated with the same intermediary party as the third intermediary resource pool, for example, the party associated with the second connector computing device. Any intermediary resource pools may be specified in any suitable manner in the set of transfer conditions, such as, for example, through a URI. Any details about the intermediary resource pools, such as the identity of parties associated with the intermediary resource pools, may also be included in the set of transfer conditions. The conditions for the second and third sub-transfers may be specified by the additional connector computing device based on the destination resource, destination resource pool indicated in the request for transfer conditions and provided by the client computing device and the intermediary resource and the second intermediary resource pool indicated in the request for transfer conditions and provided by the first connector computing device. The conditions for the first sub-transfer may be specified by the first connector computing device based on the origin resource, origin resource pool, and the conditions of the second sub-transfer, such as the quantity of the intermediate resource to be transferred out of the second intermediary resource pool.

For example, the set of transfer conditions may include an origin resource of US dollars and a destination resource of Euros. The origin resource pool may be an account on a ledger of a US branch of a first bank. The destination resource pool may be an account on a ledger of a European branch of a second bank. The set of transfer conditions generated by the first connector computing device and the second connector computing device may include a first sub-transfer, second sub-transfer, and third sub-transfer. The first sub-transfer may specify a transfer of US dollars from the account that is the origin resource pool, for example, an account belonging to the sending party, to an account belonging to the first bank on the ledger of the US branch of the first bank. The second sub-transfer may specify a transfer of quantity of a cryptocurrency from an account belonging to the first bank to an account belonging to the second bank on a public ledger for the cryptocurrency. The third sub-transfer may specify a transfer of Euros from an account belonging to the second bank on the ledger of the European branch of the second bank to the account that is the destination resource pool. This may allow the sending party to send out US dollars while the receiving party receives Euros, using a cryptocurrency as an intermediate resource. The rates of exchange, and any additional fees, may be set by the first bank and the second bank in the set of transfer conditions sent to the client computing device in response to the request for transfer conditions.

The sets of transfer conditions generated by a connector computing device may include an authentication code. The authentication code may be any form of code that may be used by the connector computing device to ensure that a client computing device or another connector computing device that receives a generated set of transfer conditions does not modify the set of transfer conditions except to provide data necessary from the client computing device or other connector computing device. For example, the authentication code may be a hash-based message authentication code. The authentication code may be generated by assembling all of the data in the set of transfer conditions that should not be modified by the client computing device or by another connector computing device into a single value. The data may be assembled into a single value in a manner that does not depend on the order in which the data is stored within the set of transfer conditions. The connector computing device may then a add a secret value, which may be known only to the connector computing device and may not be shared with the client computing device or other connector computing devices, to the single value. The result may be hashed, using any suitable hash function, to generate the authentication code for the set of transfer conditions, which may be stored with the set of transfer conditions. A single set of transfer conditions may include multiple authentication codes, for example, when the set of transfer conditions includes an additional resource tracking system, as both the first connector computing device and the second connector computing device may generate their own authentication codes to be stored with the same set of transfer conditions.

The sets of transfer conditions received or generated by a connector computing device may be sent to the client computing device. The connector computing device may send a single set of transfer conditions, for example, when no additional resource tracking systems are needed, or multiple sets of transfer conditions, for example, when an additional resource tracking system is needed and multiple additional connector computing devices responded to the request for transfer conditions. Each set of transfer conditions may appear separately, such that the client computing device, or party using the client computing device, may be able to evaluate each set of transfer conditions. For example, each set of transfer conditions may use a different additional resource tracking system, or a different intermediate resource, may include different exchange rates and fees, and may be generated by connector computing devices associated with different parties. The client computing device may be used by the sending party to select, if necessary, and accept the transfer conditions. When only a single set of transfer conditions is received by the client computing device, the client computing device may only be able to accept or reject the transfer conditions. When multiple sets of transfer conditions are received by the client computing device, the client computing device may be able to select and accept one of the sets of transfer conditions. The acceptance of a set of transfer conditions may be done through automated analysis of any available sets of transfer conditions, or the sets of transfer conditions may be presented to a representative of the sending party who may select a set of transfer conditions through a suitable user interface. Sets of transfer conditions which are not accepted may be discarded immediately, or may be maintained to be used in the event the transfer of resources using the selected set of transfer conditions fails. Sets of transfer conditions which have expired may not be accepted.

Accepting a set of transfer conditions may entail the provision of additional data which may be stored with the set of transfer conditions. For example, the client computing device may be prompted to provide additional details about the receiving party. The additional details about the receiving party may be, for example, the full name and address of the receiving party. The client computing device may provide additional data automatically, or may prompt a representative of the sending party to enter the additional data through a suitable user interface. On acceptance of the set of transfer conditions, and the provision of any additional data, the set of transfer conditions may be sent back to the connector computing device with an indication that the transfer conditions have been accepted by the client computing device. For example, the set of transfer conditions sent back to the connector computing device may include a request that the connector computing device accept the set of transfer conditions. The set of transfer conditions which has been accepted by the client computing device may include all data necessary for successful completion of the transfer of resources between the sending party and the receiving party. When an additional resource tracking system is needed, the set of transfer conditions may be sent to the first connector computing device, which may be in communication with the client computing device. The first connector computing device may send the set of transfer conditions, including the indication that the set of transfer conditions were accepted by the client computing device, to a second connector computing device, which may be the additional connector computing device that generated the set of transfer conditions that were accepted by the client computing device. Any other additional connector computing devices which were sent the request for transfer conditions may not receive the set of transfer conditions that were accepted by the client computing device, as their sets of transfer conditions may not have been accepted by the client computing device.

A connector computing device may verify a set of transfer conditions received from a client computing device. For example, a connector computing device may check to ensure that the data from the set of transfer conditions sent to the client computing device and accepted by the client computing device has not been modified in an impermissible manner before being sent back to the connector computing device after acceptance by the client computing device, that any additional details needed for the transfer of resources have been provided by the client computing device, and that the expiration of the set of transfer conditions accepted by the client computing device has not passed. The connector computing device may, for example, verify an authentication code to ensure that the set of transfer conditions were not modified impermissibly. The authentication code may be verified by, for example, generating a new authentication code from the set of transfer conditions in the same manner that the authentication code was originally generated. If the new authentication code matches the authentication code stored with the set of transfer conditions received from the client computing device, the connector computing device may consider the set of transfer conditions verified. If the new authentication code does not match the authentication code stored with the set of transfer conditions received from the client device, the connector computing device may not consider the set of transfer conditions. The set of transfer conditions may have been modified impermissibly. The connector computing device may take any appropriate action when the set of transfer conditions is considered not verified, including, for example, resending the original set of transfer conditions to the client computing device, or canceling the transfer of resources. When there is an additional resource tracking system in the resource transfer, the set of transfer conditions may be verified by both the first connector computing device and the second connector computing device. For example, the first connector computing device may verify using its authentication code, while the second connector computing device may verify using its authentication code.

After the set of transfer conditions sent back to the connector computing device is verified, the connector computing device may determine whether to accept and lock the set of transfer conditions. The set of transfer conditions may be accepted and locked when they are complete and no further data is required. The status of the set of transfer conditions may be changed from "proposed" to "locked," indicating that the connector computing device has both accepted the set of transfer conditions, and, determining them to be complete, locked them, and the transfer of resource may proceed. The set of transfer conditions may be accepted, but not locked, when the connector computing device requires additional data. The status of the set of transfer conditions may be changed from "proposed" to "accepted", indicating that the connector computing device needs additional data before locking the set of transfer conditions and allowing the transfer of resource to proceed. For example, the connector computing device may be awaiting the results of a check being run on an external system, such as, for example, verifying the identity or trustworthiness of any of the parties or systems involved in the transfer of resources as specified in the set of transfer conditions. When there is an additional resource tracking system, the first connector computing device may not be able to lock the set of transfer conditions until the second connector computing device has locked the set of transfer conditions and sent the set of transfer conditions, with the status updated to "locked", to the first connector computing device. The second connector computing device may lock the set of transfer conditions after verifying them, or may wait until additional data has been provided by, for example, the receiving party for the transfer of resources. The receiving party may receive a request for data on a second client computing device, and may use the second client computing device to provide the requested data to the second connector computing device. The second client computing device may also provide the requested data automatically. The second connector computing device may then lock the set of transfer conditions if the data provided by the second connector computing device is satisfactory, and if any other checks run on any external systems have also completed satisfactorily.

A connector computing device may generate a transfer identifier based on the set of transfer conditions received from the client computing device after the set of transfer conditions has been accepted. The transfer identifier may be generated after a connector computing device has verified, accepted, and locked the set of transfer conditions. The transfer identifier may be generated by the connector computing device when there is no additional resource tracking system, and by the second connector computing device when there is an additional resource tracking system. The transfer identifier may be any suitable identifier, such as, for example, a string of characters of any suitable length. For example, the transfer identifier may be a hexadecimal string up to 64 characters in length. The transfer identifier may be generated in any suitable manner. For example, the connector computing device may take specified values from the set of transfer conditions, represent the values as a single string, and generate a hash from the single string. The transfer identifier may then be based on the generated hash in any suitable manner. For example, the transfer identifier may be generated by representing the hash as a hexadecimal string and trimming the hexadecimal string to 64 characters. The specified values from the set of transfer conditions may be any values pertaining to any sub-transfers that may be part of the transfer of resource, or any other suitable values included in the set of transfer conditions. The transfer identifier may be stored by the connector computing device that generated the transfer identifier along with the set of transfer conditions as a record of the transfer of resources, or transfer record. The transfer identifier may also be provided to the client computing device. When the transfer includes an additional resource tracking system, the transfer identifier may be sent from the second connector computing device, which may have generated the transfer identifier, to the first connector computing device. The transfer identifier may be sent separately from, or may be stored with and included in, the set of transfer conditions. The first connector computing device may store a received transfer identifier with the set transfer conditions as a transfer record, and may provide the transfer identifier to the client computing device. The transfer identifier may also be provided to a second client computing device by the second connector computing device.

The transfer identifier may also be provided to the additional resource tracking system, which may be store the transfer identifier and any transfer instructions received by the additional resource tracking system. The additional resource tracking system may not receive the entire set of transfer conditions, and may not be able to store a full transfer record. The additional resource tracking system may instead store a partial transfer record. For example, the additional resource tracking system may store the transfer identifier with received transfer instructions which may be for a second of three sub-transfers specified in a set of transfer conditions. The transfer instructions may only specify two resource pools on the additional resource tracking system, and a quantity of a resource type to be moved from one of the resource pools to the other of the resource pools. The transfer instructions may not include, for example, an indication of any other resource pools on any other resource tracking systems, identifying data of any kind for the sending party or the receiving party, or an indication of the origin resource or destination resource for the set of transfer conditions. For example, if the additional resource tracking system is a publicly available centralized or distributed cryptocurrency ledger where records of transfers between accounts are public, the cryptocurrency ledger may store the transfer identifier along with received transfer instructions. The transfer instructions may not include any data that can be used to directly identify the sending party and the receiving party from the set of transfer conditions. The parties associated with the accounts on the cryptocurrency ledger used in the transfer may be identifiable directly from the transfer instructions or may be identifiable through data available to a party that controls the cryptocurrency ledger.

When there is no additional resource tracking system in the transfer of resources, the connector computing device may send transfer instructions to the resource tracking system which includes the origin resource pool and to the resource tracking system which includes the destination resource pool once the set of transfer conditions has been accepted and locked by the connector computing device. A resource tracking system may be able to effect the transfer (i.e., cause the transfer to occur) of resources from a source resource pool to a destination resource pool upon receiving an instruction to execute the transfer. A resource tracking system may transfer resources in any suitable manner. For example, a resource tracking system may modify the quantities of resources recorded as held by the parties which control the resource pools involved in the transfer For example, to transfer resources from a source resource pool to destination resource pool, the resource tracking system may, simultaneously or sequentially, decrease the quantity of the resource recorded as owned by the party which controls the source resource pool and increase the quantity of the resource recorded as controlled by the party which owns the destination resource pool. The quantity of the resource recorded in the source resource pool may be decreased by the same quantity that the quantity of the resource recorded in the destination resource pool is increased. For example, to transfer resources between resource pools which are accounts on a ledger of a bank branch denominated in US dollars, the source resource pool may be decremented by the quantity of US dollars being transferred, and the destination resource pool may be incremented by the same quantity of US dollars. The transfer instructions sent to the resource tracking system that includes the origin resource pool may be based on the first, or origin, sub-transfer in the set of transfer conditions, and the transfer instructions sent to the resource tracking system that includes the destination resource pool may be based on the second, or destination, sub-transfer in the set of transfer conditions. Each resource tracking system may effect a transfer of resources based on the transfer instructions it receives, resulting in execution of the first sub-transfer and the second sub-transfer. The execution of the first sub-transfer may transfer the quantity of the origin resource specified in the set of transfer conditions from the origin resource pool to a first resource pool controlled by a party associated with the connector computing device on a first resource tracking system. The execution of the second sub-transfer may transfer the quantity of the destination resource specified in the set of transfer conditions from a second resource pool controlled by the party associated with the connector computing device to the destination resource pool on a second resource tracking system.

When there is an additional resource tracking system, the first connector computing device may send transfer instructions to the resource tracking system which includes the origin resource pool and to the additional resource tracking system. The transfer instructions sent to the resource tracking system that includes the origin resource pool may be based on the first, or origin, sub-transfer in the set of transfer conditions, and the transfer instructions sent to the additional resource tracking system may be based on the second, or intermediate, sub-transfer in the set of transfer conditions. Each resource tracking system may effect a transfer of resources based on the transfer instructions it receives, resulting in execution of the origin sub-transfer and the intermediate sub-transfer. The execution of the origin sub-transfer may transfer the quantity of the origin resource specified in the set of transfer conditions from the origin resource pool to a first resource pool controlled by a party associated with the first connector computing device on a first resource tracking system. The execution of the intermediate sub-transfer may transfer a quantity of an intermediary resource as specified in the set of transfer conditions from a second resource pool controlled by the party associated with the first connector computing device to a resource pool controlled by a party associated with a second connector computing device on a second resource tracking system.

The second connector computing device may wait for confirmation that the intermediate sub-transfer has been successfully before sending transfer instructions based on the third, or destination, sub-transfer to the resource tracking system which includes the destination resource pool. For example, when a transfer is completed, a resource tracking system may be able to send out a transfer confirmation receipt, indicating that the transfer of resources between resource pools on that resource tracking system, or sub-transfer, was successful. The second connector computing device may not send transfer instructions for the third sub-transfer until such a transfer confirmation receipt, confirming the completion of the intermediate sub-transfer, has been received from the additional resource tracking system. A transfer confirmation receipt may be sent to the second connector computing device in any suitable manner. The second connector computing device may also check for the completion of the second sub-transfer in any other suitable manner, including, for example, requests for confirmation of completion of the intermediate sub-transfer sent to the additional resource tracking system, or through monitoring the status of the resource pool into which the intermediate resource is transferred to complete the intermediate sub-transfer. Upon confirming that the intermediate sub-transfer has completed successfully, the second connector computing device may send the transfer instructions based on the destination sub-transfer to the resource tracking system that includes the destination resource pool. The execution of the destination sub-transfer may transfer the quantity of the destination resource specified in the set of transfer conditions from a second resource pool controlled by the party associated with the second connector computing device to the destination resource pool on a third resource tracking system.

Transfer records for completed transfer of resources may be verified after the completion of the transfer. A transfer record may be retrieved from a connector computing device. The connector computing device may have been the only connector computing device in the transfer specified in the set of transfer conditions stored as the transfer record, or may be one among a number of connector computing devices in the transfer specified in the set of transfer conditions. The transfer record may have been stored in any suitable storage hardware connected to or otherwise accessible to the connector computing device. The transfer record may include, or be stored alongside, the transfer identifier that was generated for the set of transfer conditions which were stored as the transfer record. A new transfer identifier may be generated from the transfer record in the same manner that the transfer identifier was originally generated from the set of transfer conditions. If the new transfer identifier is identical to the transfer identifier that was stored with the transfer record, this may indicate that the set of transfer conditions was not modified after the transfer identifier was generated, and the transfer record stored from that set of transfer of conditions has not been modified either. The transfer record may be considered verified. If the new transfer identifier is not identical to the transfer identifier that was stored with the transfer record, this may indicate that either the set of transfer conditions, or the transfer record, were modified in some way after the generation of the transfer identifier. The transfer record may not be considered verified.

The partial transfer record stored on a resource tracking system that was an additional resource tracking system in a transfer of resources may be used indirectly to identify the sending party and receiving party, and their associated resource pools, as specified in the set of transfer conditions used for the transfer of resources. The additional resource tracking system may store no data that directly identifies the sending party and the receiving party and associated resource pools. The transfer instructions stored in the partial transfer record may include the identity of the parties that are associated with or control the resource pools on the additional resource tracking system that were used in the sub-transfer, for example, the intermediate sub-transfer, which occurred on the additional resource tracking system, or may only identify the resource pools. If the transfer instructions only identify the resource pools, the identity of the parties associated with the resource pools may be obtained from a party that controls the additional resource tracking system. The party that controls the additional resource tracking system may have access to records that associate resource pools with the identities of parties that are associated with or control the resource pools. Once the identities of the parties that are associated with or control the resource pools used in the sub-transfer on the additional resource tracking system have been ascertained, the connector computing devices that participated in the transfer of resources may be identified by their association with the identified parties. The connector computing devices may also be identified directly in the transfer instructions, for example, by URI, IP address, MAC address, or any other suitable identifier. The transfer identifier from the partial transfer record may then be used to identify the full transfer record in the storage of any of the identified connector computing devices. The full transfer record may include data not in the partial transfer record, including, for example, the identity of the sending party and the receiving party for the transfer of resources.

For example, a set of transfer conditions may include an origin resource pool of an account belonging to the sending party on a ledger at a branch of a US bank and a destination resource pool of an account belonging to a receiving party on a ledger at a branch of a European bank. After US dollars are transferred from the account of the sending party to an account belonging to the branch of the US bank of the branch's ledger, the US bank may transfer cryptocurrency from an account the US bank controls on a cryptocurrency ledger to an account controlled by the European bank on the cryptocurrency ledger. The European bank may then transfer Euros from its own account to the account of the receiving party on the ledger at the European bank's branch. The full transfer record may be stored on the connector computing devices used by the US bank and the European bank. A partial transfer record may be stored, and publicly available, on the cryptocurrency ledger. To determine the identity of the sending party and the receiving party from the partial transfer record, the US bank and the European bank may be identified either directly from the partial transfer record, or from their association with the cryptocurrency accounts specified in the transfer instruction in the partial transfer record. The connector computing devices of the US bank and the European bank may then be identified. The transfer identifier from the partial transfer record may then be matched to the transfer identifier stored with the full transfer record on either or both of the US bank's connector computing device and the European bank's connector computing device. The full transfer record may include data identifying both the sending party and the receiving party.

In some implementations, a resource tracking system may be able to transfer specific resources between resources tracking pools. For example, when transferring commodities, a resource tracking system may be able to transfer commodities held at a specific location between resource pools. The resource quantities for a resource with a physical instantiation may also indicate where the physical intention is located. For example, gold may be held at specific storage facility. The resource tracking system may transfer such resources by decrementing and incrementing in both resource pools a quantity of resource located in a particular location. For example, a resource pool may include gold stored at a storage facility and a storage facility B. The resource tracking system may transfer, to another resource pool, only gold from storage facility A. The resource tracking system may decrement the amount of gold recorded as stored at storage facility A in the source resource pool, and increase the amount of gold recorded as stored in storage facility A in the destination resource pool. Specific resources transferred by the resource tracking system may also include, for example, physical items of which there may be one or few copies, such as, for example, artwork including painting, sculptures, and prints, artifacts, collector's items such as sports memorabilia and comic books, jewelry, precious stones, and any other such item, or mass marketed goods, such as smartphones, foodstuffs, and so on.

Communication between the computing devices and systems for the parties may occur directly, for example, between any of the sender, the intermediaries, the receiver and the resource tracking systems, or may be routed in any suitable manner. Communications may occur directly using any suitable communications protocols, such as, for example, HTTPS. In some implementations, instead of messages being sent by one computing device or system to another, a computing device or system may check for a message on another computing device or system. Computing devices and system may communicate using any suitable communications hardware, including, for example, any suitable wired and wireless network adapters.

FIG. 1 shows an example system suitable for resource transfer setup and verification according to an implementation of the disclosed subject matter. A connector computing device 100 may include a connector 110 and a storage 140.

Figure 14:
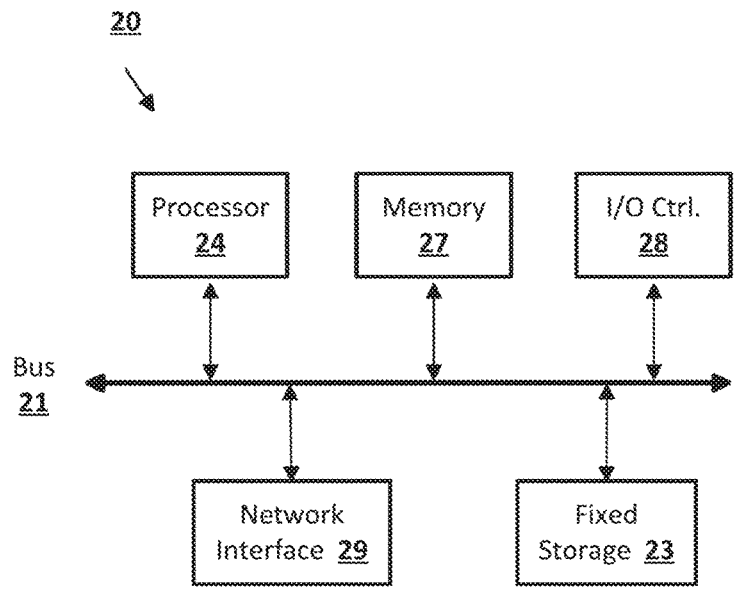
FIG. 14 shows a computer according to an embodiment of the disclosed subject matter.

The connector computing device 100 may be any suitable computing device, such as, for example, a computer 20 as described in FIG. 14, or component thereof, for implementing the connector 110 and the storage 140. The connector computing device 100 may be a single computing device, or may include multiple connected computing devices, and may be, for example, a laptop, a desktop, an individual server, a server farm, or a distributed server system, or may be a virtual computing device or system. The connector computing device 100 may be part of a computing system and network infrastructure, or may be otherwise connected to the computing system and network infrastructure. The connector 110 may be any suitable combination of hardware and software on the connector computing device 100 for receiving requests for transfer conditions, generating a set of transfer conditions, sending requests for transfer conditions, verifying sets of transfer conditions, generating transfer identifiers from sets of transfer conditions, and sending transfer instructions based on sub-transfers included in sets of transfer conditions. The storage 140 may store transfer records, such as a transfer record 146. The transfer record 146 may include a set of transfer conditions, such as transfer conditions 142, and a transfer identifier, such as the transfer identifier 148. The transfer record 146 may be stored by the connector computing device 100, for example, after a transfer of resources specified by the transfer conditions 142 is completed. The connector computing device 100 may be a computing device associated with or used by any suitable party, such as, for example, a bank, trader, exchange, or other financial institution that controls or is associated with a resource tracking system.

The connector 110 may be any suitable combination of hardware and software for implementing a transfer coordinator 112 and a record generator 114. The transfer coordinator 112 may, for example, coordinate a transfer of resources by receiving requests for transfer conditions, generating a set of transfer conditions such as the transfer conditions 142, sending requests for transfer conditions, verifying sets of transfer conditions such as the transfer conditions 142, and sending transfer instructions based on sub-transfers included in sets of transfer conditions such as the transfer conditions 142. The record generator 114 may generate transfer identifiers such as the transfer identifier 148 from sets of transfer conditions such as the transfer conditions 142. The connector 110 may use any suitable communications devices of the connector computing device 100 to communicate with other computing devices, including, for example, other connector computing devices which include their own connector similar to the connector 110. The connector 110 may implement network-accessible services that may be accessed by any suitable computing device. The services implemented by the connector 110 may allow, for example, a party such as a person, business, institution, or organization to arrange a transfer of resources and to check the status of a transfer of resources on any resource tracking system used in the transfer. For example, the connector 110 may be software run on the connector computing device 100, which may be a server system controlled by a bank.

The storage 140 may be any suitable storage hardware and software, and may provide non-volatile data storage. The storage 140 may, for example, include any combination of hard disk drives, solid state disks, tape storage, and any other non-volatile storage devices and media. The storage 140 may be a component or components of the connector computing device 100, or may accessible to the connector computing device 100 through any suitable wired or wireless connection, including local and remote connections. For example, the storage 140 may include a server system located at a separate geographic location from the connector computing device 100. The storage 140 may store the transfer record 146 in any suitable format. Any transfer records, such as the transfer record 146, stored in the storage 140 may be identifiable by the transfer identifier, such as the transfer identifier 148, stored in the transfer record. For example, the connector 110, or other suitable hardware and software of the connector computing device 110, may be able to search the storage 140 to locate a transfer record that has a specified transfer identifier. The transfer record 146 may be stored in the storage 140 after a transfer of resources specified in the transfer conditions 142 has been completed, or after the status of the transfer conditions 142 has been changed to "locked" by the connector computing device 100. Before the transfer record 146 is stored in the storage 140, the transfer conditions 142 may be stored temporarily in volatile or non-volatile storage of the connector computing device 100.

The transfer conditions 142 may be a set of transfer conditions. The transfer conditions 142 may be stored in any suitable format, such as, for example, as a JSON object. The transfer conditions 142 may include any data that may be used to complete a transfer of resources. For example, the transfer conditions 142 may store data in a number of fields, including, for example, a transfer identifier field, a state field, a results field, a last modified field, and a contract field. The transfer identifier field may store a transfer identifier for the transfer conditions 142, which may be, for example, a string such a 64-character hexadecimal string that may be a unique and persistent identification for the transfer conditions 142, and may be created by hashing data stored in the contract field. The state field may store the state of the transfer conditions 142, for example, whether they are in a "proposed", "accepted", or "locked" state. The results field may store data indicating the result of the execution of a transfer of resource as specified by the transfer conditions 142, for example, whether it is in progress, completed, or has failed. The last modified field may include a date stamp in any suitable format indicating the last time a change was made to the transfer conditions 142. The contract field may store data indicating the conditions of the transfer of resources specified by the transfer conditions 142.

The contract field may include a number of sub-fields. For example, the contract field may include an expiration field, a first authentication code field, a second authentication code field, an origin sub-transfer field, an intermediate sub-transfer field, a destination sub-transfer field, a terms field, and an entities map field. The expiration field may include a date stamp, in any suitable format, or other suitable indicator, indicating a time at which the transfer conditions 142 will expire if they have not yet been accepted by all computing devices, such as connector computing devices and client computing devices, involved in the transfer of resources. The first authentication code field may store an authentication code provided by a first connector computing device. The second authentication code field may store an authentication provided by a second connector computing device. The terms field may store additional terms for the transfer of resources, such as, for example, fees and exchange rates.

The terms field may include a number of sub-fields. For example, the terms field may include a sending fee field, an exchange rate field, and a receiving fee field. The sending fee field may store an indication of a fee that may be imposed on the transfer of resources by a party associated with a first connector computing device, and may include sub-fields, including a value sub-field and which may indicate the amount of the fee and a resource field, which may indicate the resource, for example, currency, in which the fee is denominated. The receiving fee field may store an indication of a fee that may be imposed on the transfer of resources by a party associated with a second connector computing device, and may include sub-fields, including a value sub-field and which may indicate the amount of the fee and a resource field, which may indicate the resource, for example, currency, in which the fee is denominated. The exchange rate field may store an indication of the overall exchange rate for the transfer of resources, and may include sub-fields, including a rate field storing the a number representing the ratio of the resources used in the transfer of resources, representing the amount of the destination resource valued the same as single unit of the origin resource in the transfer of resources, an origin resource field storing an indication of the origin resource type, and a destination resource field storing an indication of the destination resource type.

The origin sub-transfer field may store data indicating the conditions for a first sub-transfer for the transfer of resources specified by the transfer conditions 142. The origin sub-transfer field may include a number of sub-fields, including a sender field and a receiver field. The sender field may store data identifying the sending party for the sub-transfer. The sender field may include a number of sub-fields, including an entity field, an account field, and an amount field. The data stored in the sub-fields of a sender field that is a sub-field of the origin sub-transfer field may be related to the sending party for the transfer of resources specified by the transfer conditions 142. For example, the entity field may store data that may identify the sending party, or other entity that may be responsible for the sending out the origin resource on behalf of the sending party, in any suitable manner. The entity field may store, for example, a URI which may indicate an entry in an entity map stored in the entity map field. The entry in the entity map may store any suitable identifying information, including, for example, a name, address, email address, birthdate, phone number, US employer identification number, US social security number, US passport ID number, associated with a party, as well as a URI indicating a default resource pool, such as, for example, a bank account, for the party to be used in the transfer of resources if a resource pool for the party is not specified elsewhere in the transfer conditions 142. The account field may store data, such as a URI, indicating a resource pool, for example, the origin resource pool, associated with the entity, for example, sending party, identified by the entity field to be used in the transfer of resources. For example, the account field may store a URI. The amount field may store data indicating an amount of a resource to be transferred out of the resource pool indicated by the account field. The amount field may include a number of sub-fields, including a value field, which may store data indicating a value of the resource to be transferred, and a resource type field, which may store data indicating the type of resource to be transferred. The receiver field may store data identifying the receiving party for the sub-transfer. The receiver field may include a number of sub-fields, including an entity field, an account field, and an amount field. The data stored in the sub-fields of a receiver field that is a sub-field of the origin sub-transfer field may be related to an intermediary party for the transfer of resources specified by the transfer conditions 142. For example, the entity field may store data that may identify the intermediary party that may receive the origin resource, in any suitable manner. The account field may store data, such as a URI, indicating a resource pool, for example, an intermediary resource pool, associated with the entity, for example, intermediary party, identified by the entity field to be used in the transfer of resources. For example, the account field may store a URI. The amount field may store data indicating an amount of a resource to be transferred into the resource pool indicated by the account field. The amount field may include a number of sub-fields, including a value field, which may store data indicating a value of the resource to be transferred, and a resource type field, which may store data indicating the type of resource to be transferred.

The intermediate sub-transfer field may store data indicating the conditions for a second sub-transfer for the transfer of resources specified by the transfer conditions 142 when the transfer of resources uses an additional resource tracking system. The intermediate sub-transfer field may include a number of sub-fields, including a sender field and a receiver field. The sender field may store data identifying the sending party for the sub-transfer. The sender field may include a number of sub-fields, including an entity field, an account field, and an amount field. The data stored in the sub-fields of a sender field that is a sub-field of the intermediate sub-transfer field may be related to the intermediary party for the transfer of resources specified by the transfer conditions 142. For example, the entity field may store data that may identify the sending party for the sub-transfer, which may be an intermediary party for the transfer of resources, or other entity that may be responsible for sending out the intermediate resource on behalf of the intermediary party, in any suitable manner. The entity field may store, for example, a URI which may indicate an entry in an entity map stored in the entity map field. The entry in the entity map may store any suitable identifying information, including, for example, a name, address, email address, birthdate, phone number, US employer identification number, US social security number, US passport ID number, associated with a party, as well as a URI indicating a default resource pool, such as, for example, a bank account, for the party to be used in the transfer of resources if a resource pool for the party is not specified elsewhere in the transfer conditions 142. The account field may store data, such as a URI, indicating a resource pool, for example, an intermediary resource pool, associated with the entity, for example, intermediary party, identified by the entity field to be used in the transfer of resources. For example, the account field may store a URI. The amount field may store data indicating an amount of a resource to be transferred out of the resource pool indicated by the account field. The amount field may include a number of sub-fields, including a value field, which may store data indicating a value of the resource to be transferred, and a resource type field, which may store data indicating the type of resource to be transferred. The receiver field may store data identifying the receiving party for the sub-transfer. The receiver field may include a number of sub-fields, including an entity field, an account field, and an amount field. The data stored in the sub-fields of a receiver field that is a sub-field of the intermediate sub-transfer field may be related to an additional intermediary party for the transfer of resources specified by the transfer conditions 142. For example, the entity field may store data that may identify the additional intermediary party that may receive the intermediate resource, in any suitable manner. The account field may store data, such as a URI, indicating a resource pool, for example, an additional intermediary resource pool, associated with the entity, for example, the additional intermediary party, identified by the entity field to be used in the transfer of resources. For example, the account field may store a URI. The amount field may store data indicating an amount of a resource to be transferred into the resource pool indicated by the account field. The amount field may include a number of sub-fields, including a value field, which may store data indicating a value of the resource to be transferred, and a resource type field, which may store data indicating the type of resource to be transferred.

The destination sub-transfer field may store data indicating the conditions for a second sub-transfer for the transfer of resources specified by the transfer conditions 142 when the transfer of resources does not use an additional resource tracking system, and a third sub-transfer for the transfer of resources specified by the transfer conditions 142 when the transfer of resources does uses and additional resource tracking system. The destination sub-transfer field may include a number of sub-fields, including a sender field and a receiver field. The sender field may store data identifying the sending party for the sub-transfer. The sender field may include a number of sub-fields, including an entity field, an account field, and an amount field. The data stored in the sub-fields of a sender field that is a sub-field of the destination sub-transfer field may be related to an intermediary party, or additional intermediary party, for the transfer of resources specified by the transfer conditions 142. For example, the entity field may store data that may identify the sending party for the sub-transfer, which may be an intermediary party, or additional intermediary party, for the transfer of resources, or other entity that may be responsible for sending out the destination resource on behalf of the intermediary party, or additional intermediary party, in any suitable manner. The entity field may store, for example, a URI which may indicate an entry in an entity map stored in the entity map field. The entry in the entity map may store any suitable identifying information, including, for example, a name, address, email address, birthdate, phone number, US employer identification number, US social security number, US passport ID number, associated with a party, as well as a URI indicating a default resource pool, such as, for example, a bank account, for the party to be used in the transfer of resources if a resource pool for the party is not specified elsewhere in the transfer conditions 142. The account field may store data, such as a URI, indicating a resource pool, for example, an intermediary resource pool, associated with the entity, for example, intermediary party or additional intermediary party, identified by the entity field to be used in the transfer of resources. For example, the account field may store a URI. The amount field may store data indicating an amount of a resource to be transferred out of the resource pool indicated by the account field. The amount field may include a number of sub-fields, including a value field, which may store data indicating a value of the resource to be transferred, and a resource type field, which may store data indicating the type of resource to be transferred. The receiver field may store data identifying the receiving party for the sub-transfer. The receiver field may include a number of sub-fields, including an entity field, an account field, and an amount field. The data stored in the sub-fields of a receiver field that is a sub-field of the destination sub-transfer field may be related to the receiving party for the transfer of resources specified by the transfer conditions 142. For example, the entity field may store data that may identify the receiving party that may receive the destination resource, in any suitable manner. The account field may store data, such as a URI, indicating a resource pool, for example, an additional intermediary resource pool, associated with the entity, for example, the additional intermediary party, identified by the entity field to be used in the transfer of resources. For example, the account field may store a URI. The amount field may store data indicating an amount of a resource to be transferred into the resource pool indicated by the account field. The amount field may include a number of sub-fields, including a value field, which may store data indicating a value of the resource to be transferred, and a resource type field, which may store data indicating the type of resource to be transferred.

Figure 2:
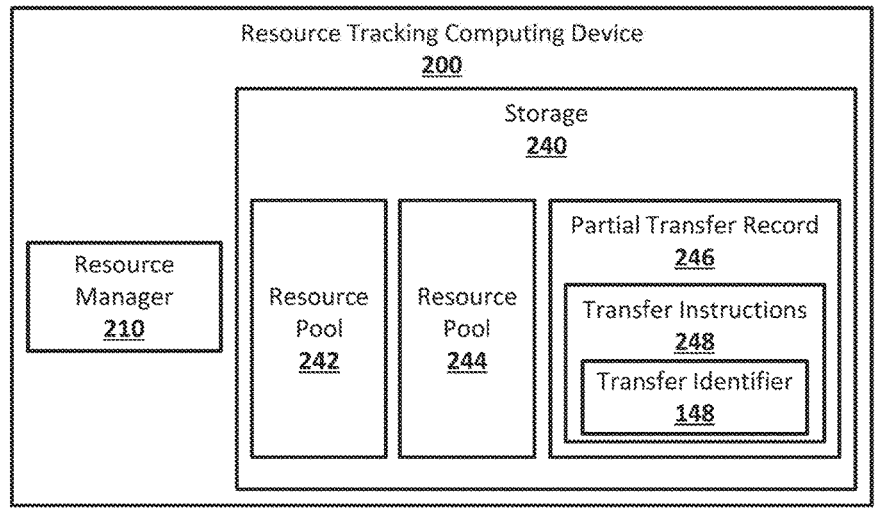
FIG. 2 shows an example system suitable for resource transfer setup and verification according to an implementation of the disclosed subject matter.

FIG. 2 shows an example system suitable for resource transfer setup and verification according to an implementation of the disclosed subject matter. A resource tracking computing device 200 may include a resource manager 210 and a storage 240. The resource tracking computing device 200 may be any suitable computing device, such as, for example, a computer 20 as described in FIG. 14, or component thereof, for implementing the resource manager 210 and the storage 240. The resource tracking computing device 200 may be a single computing device, or may include multiple connected computing devices, and may be, for example, a laptop, a desktop, an individual server, a server farm, or a distributed server system, or may be a virtual computing device or system. The resource tracking computing device 200 may be part of a computing system and network infrastructure, or may be otherwise connected to the computing system and network infrastructure. The resource tracking computing device 200 may be, for example, a system tracking a ledger for a bank or a branch of a bank, or may be a public cryptocurrency ledger that may distributed or centralized. The resource manager 210 may be any suitable combination of hardware and software on the resource tracking computing device 200 for managing resources belonging to various parties and tracked by the resource tracking computing device 200. The resources may be tracked in resource pools, such as, for example, the resource pools 242 and 244 in the storage 240. The storage 240 may store pending transfer 246, along with the resource pools, such as the resource pools 242 and 244, for the various parties with resource tracked by the resource tracking computing device 200. The storage 240 may also store partial transfer records, such as the partial transfer record 246. The resource pools 242 and 244 may be records of resources owned by parties and tracked by the resource tracking computing device 200, including the types and quantities of the resources, and an identification of the party that owns or controls the resources in the resource pool. The resource tracking computing device 200 may be a resource tracking system, which may or may not be affiliated or belong to a particular person or organization, or may be a component of a server system.

The resource manager 210 may be any suitable combination of hardware and software on the resource tracking computing device 200 for managing resources belonging to various parties and tracked by the resource tracking computing device 200. The resource manager 210 may be able to receive transfer instructions, which may indicate that resources tracked by the resource tracking computing device 200 are to be transferred from one resource pool on the resource tracking computing device 200 to another resource pool on the resource tracking computing device 200.

The resource manager 210 may be able to transfer resources between resource pools, such as the resource pool 242 and the resource pool 244, by decrementing the quantity of the resources in one resource pool and incrementing the quantity of the resources in the other resource pool by the same quantity. For example, the resource manager 210 may transfer 100 US dollars from the resource pool 242 to the resource pool 244 by decrementing the quantity of US dollars recorded by the resource pool 242 by 100, and incrementing the quantity of US dollars recorded by the resource pool 244 by 100.

The partial transfer record 246 may include transfer instruction 248 and transfer identifier 148. The partial transfer record 246 may be stored in the storage 240 after the resource manager 210 has performed on a transfer of resources on the resource tracking computing device 200 in response to received transfer instructions. The resource tracking computing device 200 may store the partial transfer record 246 when the resource tracking computing device 200 is the additional resource tracking system in a transfer of resources that uses three resource tracking systems. The received transfer instruction may be stored in the partial transfer record 246 as the transfer instructions 248. The transfer instructions 248 may include data from the transfer conditions 142 that pertain to the resource tracking computing device 200, such as, for example, identifiers, such as URIs, for both the origin resource pool and destination resource pool for a sub-transfer executed by the resource manager 210 on the resource tracking computing device 200, an amount and type of resource for the sub-transfer, and any suitable identifying data for intermediary parties that control or are associated with the origin resource pool and destination resource pool for the sub-transfer. The transfer instructions 248 may not include other data from the transfer conditions 142, such as, for example, any data that may directly identify the sending party or receiving party to the transfer of resources specified in the transfer conditions 142. For example, when a transfer of resources involves an intermediate sub-transfer on cryptocurrency ledger between accounts controlled be separate banks, the transfer instructions 248 may identify both the accounts and the banks which control the accounts. The transfer instructions 248 may not identify the sending party, which may control the origin resource pool for the origin sub-transfer on a separate ledger, or the receiving party, which may control the destination resource pool for the destination sub-transfer on another separate ledger. The partial transfer record 246 may also store the transfer identifier 148, which may be the transfer identifier generated for the transfer conditions 142. The transfer identifier 148 may be provided to the resource tracking computing device 200, along with transfer instructions to be executed and stored as the transfer instructions 248, by, for example, the connector computing device 100. The connector computing device 100 and resource tracking computing device 200 may communicate using any suitable hardware communications devices or interfaces, including, for example, any suitable combination of wired and wireless connections, local and wide area connections, and public and private connections. Any suitable security or cryptographic protocols may be used.

Figure 3:
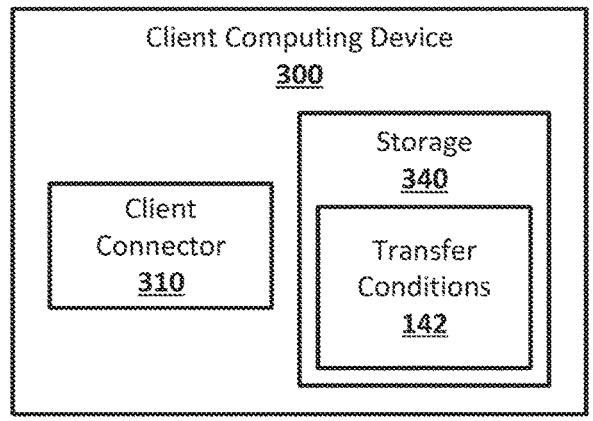
FIG. 3 shows an example system suitable for resource transfer setup and verification according to an implementation of the disclosed subject matter.

FIG. 3 shows an example system suitable for resource transfer setup and verification according to an implementation of the disclosed subject matter. A client computing device 300 may include client connector 310 and a storage 340. The client computing device 300 may be any suitable computing device, such as, for example, a computer 20 as described in FIG. 14, or component thereof, for implementing the client connector 310 and the storage 340. The client computing device 300 may be a single computing device, or may include multiple connected computing devices, and may be, for example, a laptop, a desktop, an individual server, a server farm, or a distributed server system, or may be a virtual computing device or system. The client computing device 300 may be part of a computing system and network infrastructure, or may be otherwise connected to the computing system and network infrastructure. The client connector 310 may be any suitable combination of hardware and software on the client computing device 300 for sending a request for transfer conditions, selecting and accepting sets of transfer conditions, such as the transfer conditions 142, tracking the progress of a transfer of resources, and providing any suitable data to be stored in a set of transfer conditions. The storage 340 may store the transfer conditions 142, which may be, for example, a set of transfer conditions received in response to a request for transfer conditions. The transfer conditions 142 may be the set of transfer conditions selected using the client connector 310, and may be stored in the storage 340 while the transfer of resources is in progress specified in the transfer conditions 142 is being set up or is in progress. Successful completion of the transfer may result in the removal of the transfer conditions 142 from the storage 340. The client computing device 300 may be used by a sending party, which may be any suitable party that may wish to transfer resources to a receiving party, or by a receiving party, which may be any suitable party that may control a destination resource pool for a transfer of resources. A receiving party may use a client computing device, such as the client computing device 300, when requested by, for example, a connector computing device such as the connector computing device 100 to provide additional information about the receiving party to be stored as part of the transfer conditions 142.

The client connector 310 may be any suitable combination of hardware and software on the client computing device 300 for sending a request for transfer conditions, selecting and accepting sets of transfer conditions, such as the transfer conditions 142, tracking the progress of a transfer of resources, and providing any suitable data to be stored in a set of transfer conditions. The client connector 310 may be able to communicate with a connector, such as the connector 110 of the connector computing device 100. The client connector 310 may be used, for example, by a sending party, to send a request for transfer conditions to the connector 110 using any suitable form of communications, such as, for example, HTTP. The client connector 310 may receive from the connector 110 any sets of transfer conditions, such as the transfer conditions 142, generated or procured by the connector 110 in response to the request for transfer conditions. The client connector 310 may allow for the selection and acceptance of a set of transfer conditions when multiple sets of transfer conditions are received, or the acceptance or refusal of a single received set of transfer conditions. The selection and acceptance may be made, for example, through a user interface for the client connector 310 provided to a user, based on input received from the user, or automatically, for example, through analysis of any received sets of transfer conditions by the client connector 310. The selection of a set of transfer conditions, such as the transfer conditions 142, may be communicated from the client connector 310 to the connector 110 using any suitable form of communication, such as, for example, an HTTP POST of the selected set of transfer of conditions. The client connector 310 may provide any suitable data for a set of transfer conditions, such as the transfer conditions 142. For example, a sending party or receiving party may be requested to provide additional identifying data, for example, to be stored in the entity map of the transfer conditions 142. The requested identifying data may be input to the client connector 310 through any suitable user interface, or may be retrieved, for example, from the storage 340, by the client connector 310. The client connector 310 may communicate with the connector 110 to determine the status of a transfer of resources that is in progress in any suitable manner, such as, for example, through HTTP GET requests. The services implemented by the client connector 310 may allow, for example, a party such as a person, business, institution, or organization to arrange a transfer of resources and to check the status of a transfer of resources on any resource tracking system used in the transfer. For example, the client connector 110 may be software run on the client computing device 100, which may be computer, server system, or other suitable computing device controlled by a person business, institution, or organization.

Figure 4:
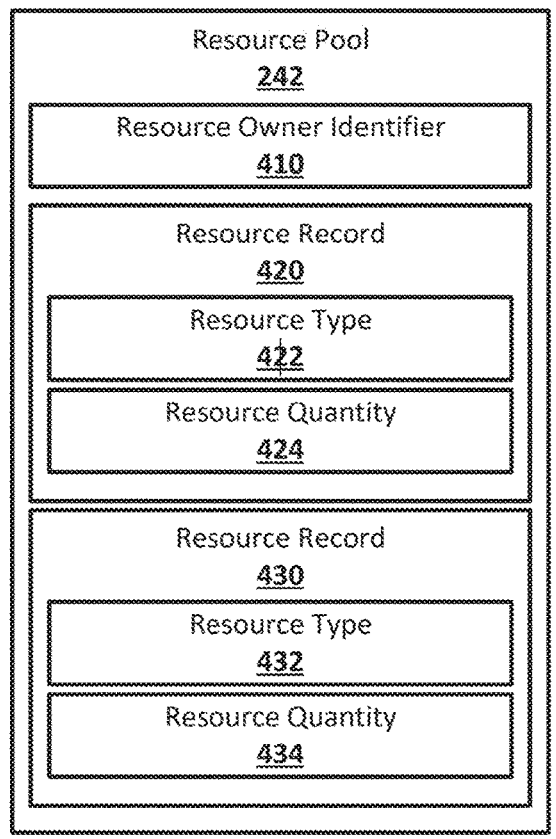
FIG. 4 shows an example system suitable for resource transfer setup and verification according to an implementation of the disclosed subject matter.

FIG. 4 shows an example system suitable for resource transfer setup and verification according to an implementation of the disclosed subject matter. The resource pool 242 on the resource tracking computing device 200 may include a resource owner identifier 410, and resource records 420 and 430. The resource owner identifier 410 may be any suitable identification of the party that owns the resources recorded in the resource pool 242. For example, the resource owner identifier may be a name of a person, organization, or user or process on a server system, an arbitrary name, a username and password combination, a passphrase or passcode, a unique number, or a cryptographic public key. The resource records 420 and 430 may include resource types 422 and 432, and resource quantities 424 and 434. The resource types 422 and 432 may indicate the type of resource that is recorded in the resource records 420 and 430. The resource types 422 and 432 may be any suitable resource of asset, such as, for example, currency, cryptocurrency, commodities, financial instruments, or computational resources. The resource quantities 422 and 424 may indicate the quantity of the resource types 422 and 432 owned by the party identified by the resource owner identifier 410 and tracked in the resource pool 242. The resource quantities 422 and 424 may be stored in, for example, registers or memory cells on the resource tracking computing device 200.

The resource tracking computing device 200 may track resources in any suitable manner. For example, the resource tracking computing device 200 may pool resources by type, with each resource pool, such as the resource pool 242, tracking a particular resource type, such as the resource type 422. The resource pool 242 may then include the resource quantity 424 of the resource type 422 held by each party that owns any amount of the resource type 422, using resource owner identifiers such as the resource owner identifier 410.

Figure 5:
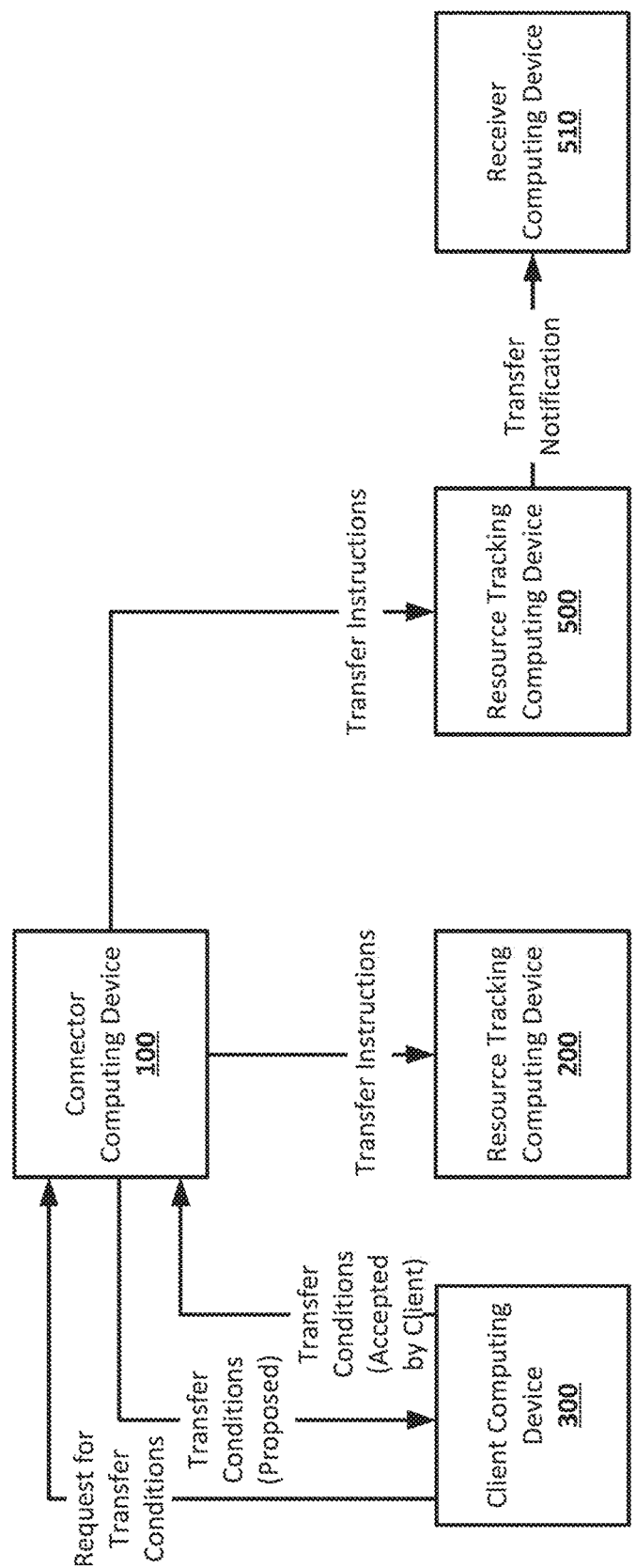
FIG. 5 shows an example arrangement suitable for resource transfer setup and verification according to an implementation of the disclosed subject matter.

FIG. 5 shows an example arrangement suitable for resource transfer setup and verification according to an implementation of the disclosed subject matter. A client computing device 300 may send out a request for transfer conditions. For example, the client connector 310 may gather and compile any suitable data for the request for transfer conditions, and may send the request for transfer conditions to the connector 110 of the connector computing device 100 using any suitable communications hardware and protocols. For example, the request for transfer conditions may be sent using an HTTP GET request. The data gathered by the client connector 310 to be included in the request for transfer conditions may include, for example, an identification of the destination resource pool, an identification of the origin resource pool, the amount and type of the destination resource to be transferred into the destination resource pool, and optionally, an identification of one or more of the intermediary resources pools that may be used in the transfer of resources. The resource pools may be identified in any suitable manner, such as, for example, with a URI. For example, the client connector 310 may gather a URI for a bank account controlled by the sending party at a branch of a bank, the URI for a bank account controlled by the receiving party at a second branch of the bank that may be located in a foreign jurisdiction to the first branch, and the amount and type of currency that will be transferred into the receiving party's bank account.

The request for transfer conditions may be received by the connector computing device 100, for example, by the connector 110. The connector 110 may, for example, listen for HTTP GET requests from client connectors, such as the client connector 310. The connector 110 may analyze the request for transfer conditions to determine that no additional resource tracking system is needed for the transfer of resources. For example, the connector 110 may determine that connector computing device 100 is controlled by or associated with a party that also controls or is associated with both a resource pool on the same resource tracking system as the origin resource pool specified in the request for transfer conditions and a second resource pool on the same resource tracking system as the destination resource pool specified in the request for transfer conditions, and that the second resource pool includes a resource of the same type that is to be transferred into the destination resource pool. For example, the connector computing device 100 may belong to a bank, and the connector 110 may determine based on a received request for transfer conditions that the origin resource pool is an account on a ledger of a US branch of the bank, the destination resource pool is an account on a ledger at a French branch of the bank, and the resource type to be transferred into the destination resource pool is Euros, which the bank holds in an account of its own on the ledger of the French branch.

With no additional resource tracking system needed for the transfer of resources, the transfer coordinator 112 of the connector 110 may generate a set of transfer conditions, such as, for example, the transfer conditions 142. The transfer coordinator 112 may, for example, store any suitable data in any suitable fields of a data object, such as a JSON object, to complete a set of transfer conditions. The data may include, for example, the transfer identifier, an expiration time, a message authentication code for the connector computing device 100, data specifying the origin sub-transfer and the destination sub-transfer, including identification of any intermediary resource pools, for example, by URI, and any fee and exchange rate data. The set of transfer conditions generated by the transfer coordinator 112 may be sent back to the client connector 310 in any suitable manner, such as, for example, using HTTP to send a JSON object.

The client connector 310 may receive the set of transfer conditions from the connector 110 of the connector computing device 100. The set of transfer conditions may be in a "proposed" state, and may be stored in the storage 340 as the transfer conditions 142. The client connector 310 may accept the transfer conditions 142. For example, the transfer conditions 142 may be presented to a user in any suitable manner, and input may be received from the user through a user interface indicating an acceptance of the transfer conditions 142. The transfer conditions 142 may also be accepted without being presented to a user and without receiving input from a user, for example, through automated analysis of the transfer conditions 142 by the client connector 310. The analysis may determine, for example, if the transfer conditions 142 meet any suitable criteria for acceptance, such as having fees below some threshold level. The client connector 310 may provide any additional data that may be needed to complete the transfer conditions 142, such as, for example, additional identifying data for the sending party or receiving party. The acceptance of the transfer conditions 142 may be communicated by the client connector 310 to the connector 110 in any suitable manner, such as, for example, through an HTTP POST of a data object, such as a JSON object, including the transfer conditions 142.

The transfer coordinator 112 may review the transfer conditions 142 sent back from the client connector 310, and may determine that the transfer conditions 142 are complete and have not been tampered with. For example, the transfer coordinator 112 may check the message authentication code by generating a new message authentication code from the received transfer conditions 142 and comparing the new message authentication code to the message authentication code stored with the transfer conditions 142. If the new message authentication code matches the stored message authentication code, the transfer coordinator 112 may proceed with the transfer of resources specified in the transfer conditions 142. The status of the transfer conditions 142 may be updated to "locked." The transfer coordinator 112 may send out, from the connector computing device 100, transfer instructions to both the resource tracking computing device 200 and a resource tracking computing device 500.

The resource tracking computing device 200 may include the origin resource pool for the transfer of resources and an intermediary resource pool. The transfer instructions sent to the resource tracking computing device 200 may be based on the origin sub-transfer stored in the transfer conditions 142. The resource tracking computing device 200 may execute the origin sub-transfer by transferring a specified amount of resources from the origin resource pool to the intermediary resource pool. The transferred resource may be the origin resource for the transfer of resource specified in the transfer conditions 142. The resource tracking computing device 200 may confirm the successful execution of the transfer to the connector computing device 100, for example, by sending a confirmation to the connector computing device 100. The connector computing device 100 may also query the resource tracking computing device 200 to determine when the origin sub-transfer has completed successfully. For example, the resource tracking computing device 200 may be the server system of a US branch of a bank that tracks the ledger of the branch. The connector computing device 100 may be a system belonging to the bank, and may be in communication with the resource tracking computing device 200, for example, through the Internet, or through a private network belonging to the bank. The server system at the US branch may receive transfer instructions for an origin sub-transfer, and may transfer an amount of US dollars out of the origin resource pool, which may be an account controlled by the sending party, and into the destination resource pool, which may be an account controlled by the bank, on the ledger of the US branch.

The resource tracking computing device 500 may include the destination resource pool for the transfer of resources and an intermediary resource pool. The transfer instructions sent to the resource tracking computing device 500 may be based on the destination sub-transfer stored in the transfer conditions 142. The resource tracking computing device 500 may execute the destination sub-transfer by transferring a specified amount of resources from the intermediary resource pool to the destination resource pool. The resource transferred may be the destination resource for the transfer of resources specified in the transfer conditions 142. The resource tracking computing device 500 may confirm the successful execution of the transfer to the connector computing device 100, for example, by sending a confirmation to the connector computing device 100. The connector computing device 100 may also query the resource tracking computing device 500 to determine when the destination sub-transfer has completed successfully. For example, the resource tracking computing device 500 may be the server system of a French branch of the same bank at whose US branch the origin sub-transfer took place, and that tracks the ledger of the branch. The connector computing device 100 may be a system belonging to the bank, and may be in communication with the resource tracking computing device 500, for example, through the Internet, or through a private network belonging to the bank. The server system at the French branch may receive transfer instructions for a destination sub-transfer, and may transfer an amount of Euros out of the intermediary resource pool, which may be an account controlled by the bank, and into the destination resource pool, which may be an account controlled by the receiving party. The receiving party may receive a notification when the transfer of resource has been completed, for example, at the receiver computing device 510.

While the transfer of resources is in progress, the transfer conditions 142 may be updated based on the state of the sub-transfers and the overall transfer of resources. For example, the state of the transfer conditions 142 may be changed to "in progress" from "locked" while the transfer of resources is in progress, and to either "succeeded" or "failed" depending on the outcome of the transfer of resources. The origin sub-transfer and destination sub-transfer may have their own states, which may also be updated, for example, indicated whether each sub-transfer is "in progress", "succeeded", or "failed".

Figure 6:
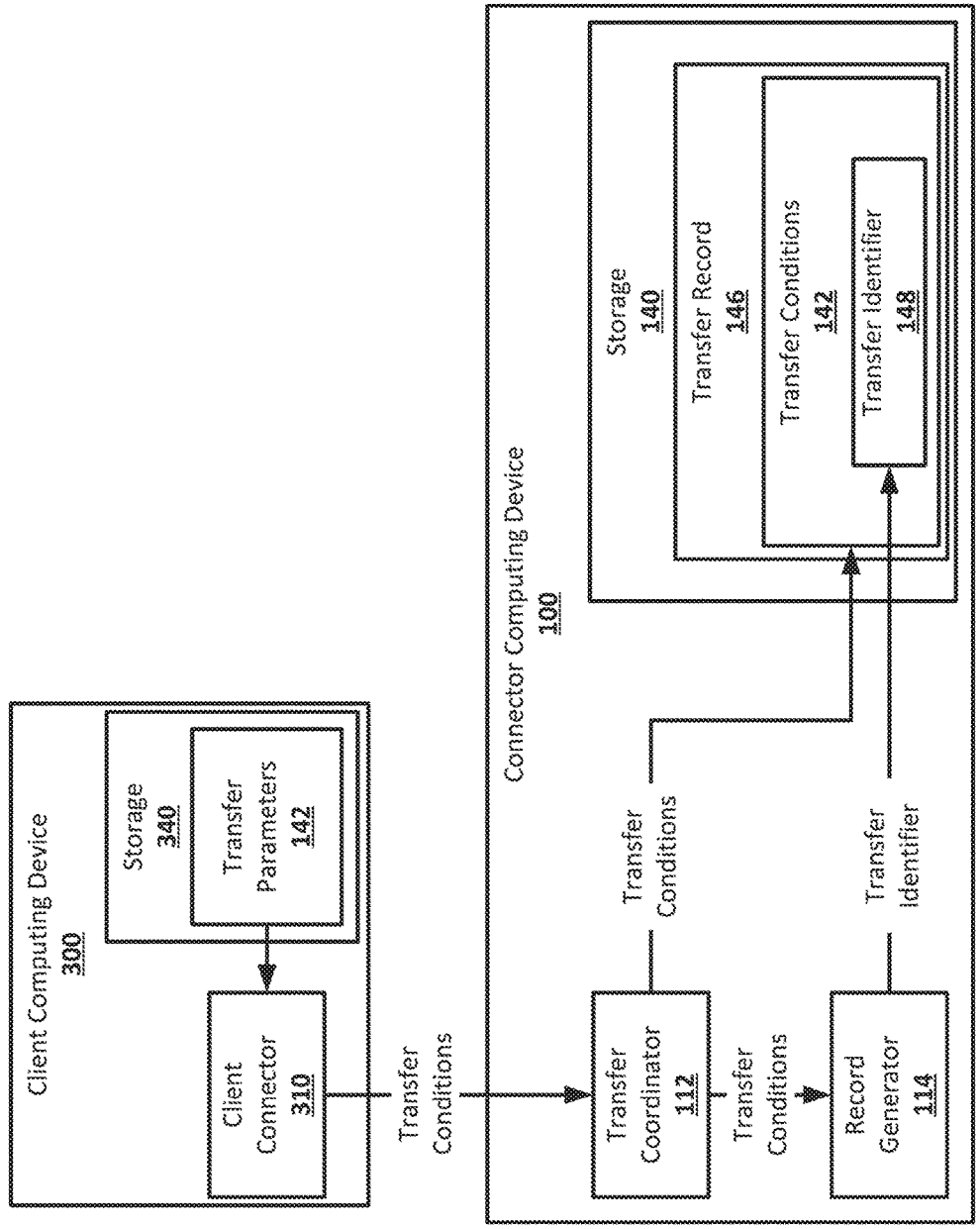
FIG. 6 shows an example arrangement suitable for resource transfer setup and verification according to an implementation of the disclosed subject matter.

FIG. 6 shows an example arrangement suitable for resource transfer setup and verification according to an implementation of the disclosed subject matter. The connector computing device 100 may generate and store the transfer identifier 148 for the transfer conditions 142. For example, when the transfer conditions 142 are accepted by the client computing device 300, and the acceptance is received from the client connector 310, the transfer coordinator 112 may send the transfer conditions 142 to the record generator 114. The record generator 114 may generate the transfer identifier 148 in any suitable manner. For example, the record generator 114 may retrieve data from any suitable fields of the transfer conditions 142, such as any fields related to the origin sub-transfer and destination sub-transfer, represent the data as single value, hash the single value into a hexadecimal string, and trim the hexadecimal string to 64 characters, generating the transfer identifier 148. The transfer identifier 148 may be included in the transfer conditions 142. On successful completion of the transfer of resources specified by the transfer conditions 142, the transfer conditions 142 with the transfer identifier 148 may be stored as the transfer record 146 in the storage 140. In some implementations, the transfer conditions 142 may also be stored as the transfer record 146 when the transfer of resources fails. The connector computing device 100 may maintain a database of transfer records, such as the transfer record 146. The database may be stored locally or remotely, for example, on a storage server system accessible to the connector computing device 100.

Figure 7A:
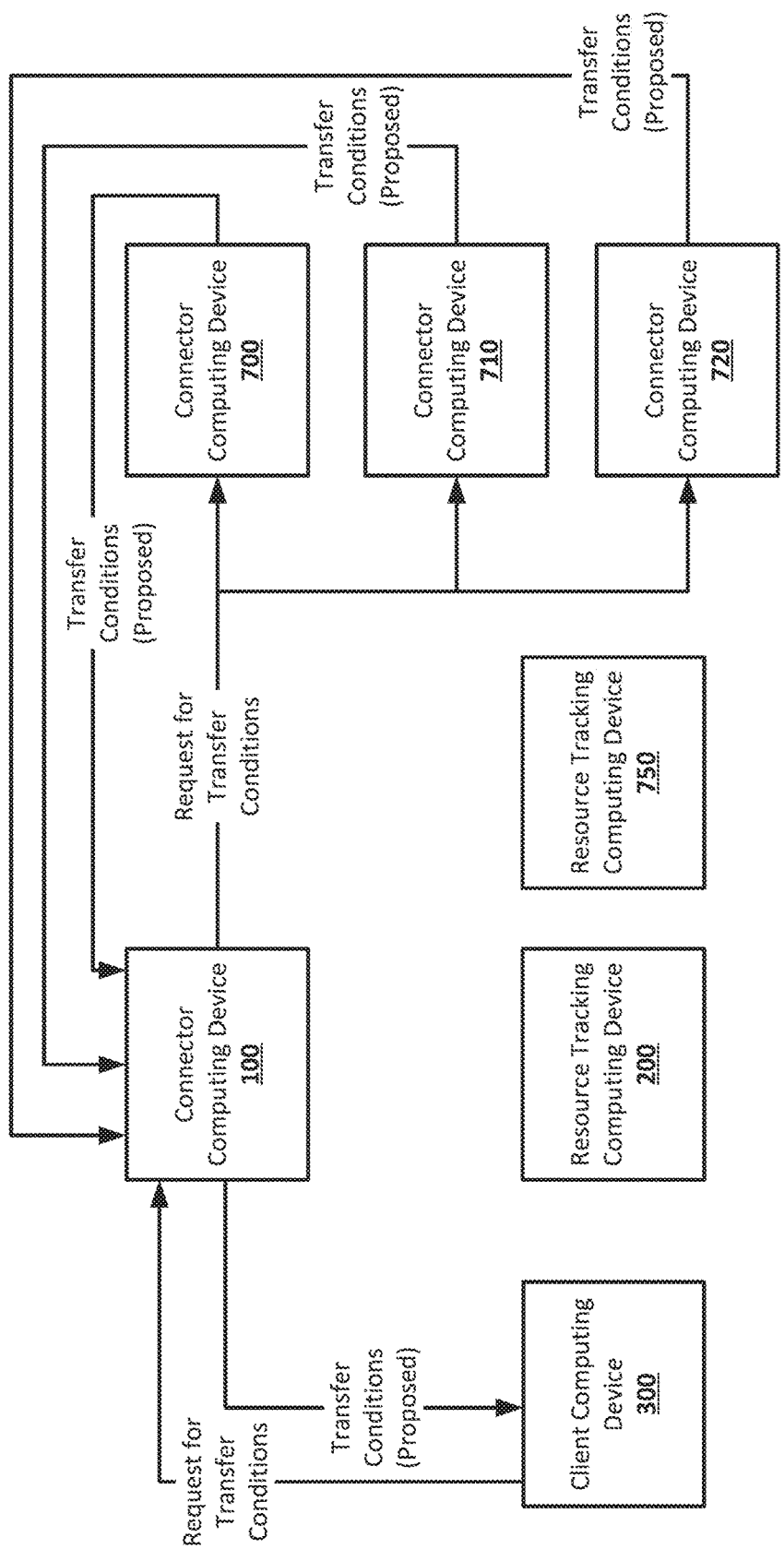
FIG. 7A shows an example arrangement suitable for resource transfer setup and verification according to an implementation of the disclosed subject matter.

FIG. 7A shows an example arrangement suitable for resource transfer setup and verification according to an implementation of the disclosed subject matter. A client computing device 300 may send out a request for transfer conditions. For example, the client connector 310 may gather and compile any suitable data for the request for transfer conditions, and may send the request for transfer conditions to the connector 110 of the connector computing device 100 using any suitable communications hardware and protocols. For example, the request for transfer conditions may be sent using an HTTP GET request. The data gathered by the client connector 310 to be included in the request for transfer conditions may include, for example, an identification of the destination resource pool, an identification of the origin resource pool, the amount and type of resource to be transferred into the destination resource pool, and optionally, an identification an identification of one or more of the intermediary resources pools that may be used in the transfer of resources. The resource pools may be identified in any suitable manner, such as, for example, with a URI. For example, the client connector 310 may gather a URI for a bank account controlled by the sending party at a branch of a bank, the URI for a bank account controlled by the receiving party at a second branch of the bank that may be located in a foreign jurisdiction to the first branch, and the amount and type of currency that will be transferred into the receiving party's bank account.

The request for transfer conditions may be received by the connector computing device 100, for example, by the connector 110. The connector 110 may, for example, listen for HTTP GET requests from client connectors, such as the client connector 310. The connector 110 may analyze the request for transfer conditions to determine that an additional resource tracking system is needed for the transfer of resources. For example, the connector 110 may determine that connector computing device 100 is not controlled by or associated with a party that also controls or is associated with a resource pool on the same resource tracking system as the destination resource pool specified in the request for transfer conditions, or that the connector computing device 100 does control such a resource pool, but the resource pool does not include a resource of the same type that is to be transferred into the destination resource pool. For example, the connector computing device 100 may belong to a first bank, and the connector 110 may determine based on a received request for transfer conditions that the origin resource pool is an account on a ledger of a US branch of the first bank and the destination resource pool is an account on a ledger at a French branch of second bank at which the first bank does not have an account.

With an additional resource tracking system needed for the transfer of resources, the transfer coordinator 112 of the connector 110 may send out a request for transfer conditions to additional connector computing devices, such as the connector computing devices 700, 710, and 720, which may each control or be associated with both the resource tracking system which includes the destination resource pool and additional resource tracking systems on which the connector computing device 100 controls a resource pool. For example, each of the connector computing devices 100, 700, 710, and 720 may control their own resource pool on the resource tracking computing device 750. The resource tracking computing device 750 may be, for example, a public, centralized or distributed ledger for a cryptocurrency. The resource tracking system on which the connector computing device 100 and another connector computing device control resource pools may be different for each of the other connector computing devices. For example, the connector computing device 100 and the connector computing device 720 may both control resource pools on the resource tracking computing device 750, while the connector computing device 100 and the connector computing device 710 may both control resource pools on another resource tracking system. The request for transfer conditions sent out from the connector computing device 100 may include an identifier, such as, for example, a URI for the resource tracking computing device 750. This may indicate that the connector computing device 100 has proposed using the resource tracking computing device 750 as the additional resource tracking system in the transfer of resources.

Each of the connector computing devices 700, 710, and 720 may receive the request for transfer conditions from the connector computing device 100, and may each generate a set of transfer conditions, such as, for example, the transfer conditions 142. The transfer coordinator of each of the connector computing devise 700, 710, and 720 may, for example, each store any suitable data in any suitable fields of a data object, such as JSON object, to complete a set of transfer conditions. The data may include, for example, the transfer identifier, an expiration time, a message authentication code for the connector computing device 700, 710, or 720 that is generating the set of transfer conditions, data specifying an intermediate sub-transfer and a destination sub-transfer, including identification of any intermediary resource pools, for example, by URI, and any fee and exchange rate data. The data specifying the intermediate sub-transfer may only include the resource pool that will receive the intermediate resource in the intermediate sub-transfer if the request for transfer conditions did not specify the resource pool controlled by or associated with the connector computing device 100 that will transfer out resources for the intermediate sub-transfer. Each set of transfer conditions generated at the connector computing devices 700, 710, and 720 may be sent back to the connector 110 of the connector computing device 100 in any suitable manner, such as, for example, using HTTP to send a JSON object.

The connector 110 of the connector computing device 100 may receive the sets of transfer conditions from the connectors of connector computing devices 700, 710, and 720, and may add additional data to the sets of transfer conditions, such as, for example, the transfer conditions 142. The transfer coordinator 112 may store any suitable additional data in any suitable fields of data objects, such as JSON objects, so that the sets of transfer conditions may include enough data to be set to the "proposed" state and sent to the client connector 310 of the client computing device 300. The data may include, for example, a message authentication code for the connector computing device 100, data specifying the origin sub-transfer and completing the intermediate sub-transfer if the resource pool controlled by or associated with the connector computing device 100 out which resources will be transferred was not previously specified, including identification of any intermediary resource pools, for example, by URI, and any fee and exchange rate data. The sets of transfer conditions may be sent back to the client connector 310 in any suitable manner, such as, for example, using HTTP to send JSON objects.

The client connector 310 may receive the sets of transfer conditions from the connector 110 of the connector computing device 100. The sets of transfer conditions may be in a "proposed" state, and may be stored in the storage 340 as transfer conditions, such as the transfer conditions 142. The client connector 310 may accept one of the sets of transfer conditions, such as, for example, the transfer conditions 142. For example, the sets of transfer conditions, including the transfer conditions 142, may be presented to a user in any suitable manner, and input may be received from the user through a user interface indicating the user selects and accepts the transfer conditions 142. The transfer conditions 142 may also be selected and accepted without being presented to a user and without receiving input from a user, for example, through automated analysis of the sets of transfer conditions, including the transfer conditions 142 by the client connector 310. The analysis may determine, for example, which of the sets of transfer conditions, including the transfer conditions 142, meet any suitable criteria for acceptance, such as having fees below some threshold level, and may be comparatively better than the other sets of transfer conditions, for example, having the lowest fees. The client connector 310 may provide any additional data that may be needed to complete the transfer conditions 142, such as, for example, additional identifying data for the sending party or receiving party. The acceptance of the transfer conditions 142 may be communicated by the client connector 310 to the connector 110 in any suitable manner, such as, for example, through an HTTP POST of a data object, such as a JSON object, including the transfer conditions 142. The other sets of transfer conditions may be stored, for example, in the storage 340, so that they may be selected and accepted by the client connector 310 in the event that the transfer of resources using the transfer conditions 142 fails.

Figure 7B:
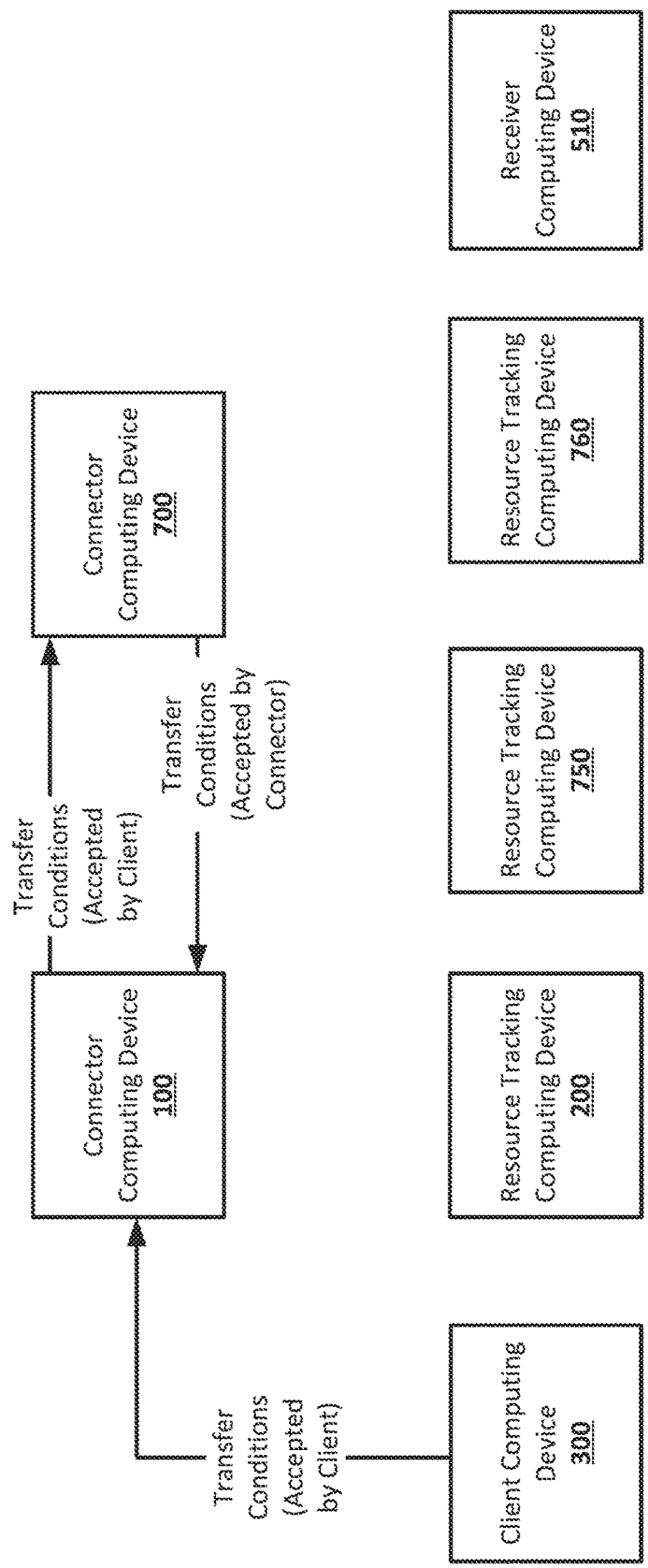
FIG. 7B shows an example arrangement suitable for resource transfer setup and verification according to an implementation of the disclosed subject matter.

FIG. 7B shows an example arrangement suitable for resource transfer setup and verification according to an implementation of the disclosed subject matter. The transfer coordinator 112 of the connector 110 may send the transfer conditions 142 received from the client connector 310 of the client computing device 300 to the connector computing device that generated the transfer conditions 142, such as, for example, the connector computing device 700. The transfer coordinator of the connector computing device 700 may review the transfer conditions 142 sent back from the connector computing device 100 and may determine that the transfer conditions 142 are complete and have not been tampered with. For example, the transfer coordinator of the connector computing device 700 may check the message authentication code that was included in the transfer conditions by the connector computing device 700 by generating a new message authentication code from the received transfer conditions 142 and comparing the new message authentication code to the message authentication code stored with the transfer conditions 142 by the connector computing device 700. If the new message authentication code matches the stored message authentication code, the transfer coordinator may accept the transfer conditions 142. If there are no other issues, such as missing data, the status of the transfer conditions 142, as stored on the connector computing device 700, may be updated to "locked". The connector of the connector computing device 700 may communicate to the connector computing device 100, for example, communicating with the connector 110, that the connector computing device 700 has locked the transfer conditions 142. If there are issues, such as missing data, the status of the transfer conditions 142 as stored on the connector computing device 700 may be updated to "accepted." The connector computing device 700 may then perform any suitable data gathering, such as, for example, communicating with other external computing devices or systems, including, for example, the receiver computing device 510, in order to complete the transfer conditions 142. For example, the receiver computing device 510 may include its own client connector, similar to the client connector 310. The connector of the connector computing device 700 may communicate with the client connector of the receiver computing device 510 to request additional data, such as, for example, additional identifying data for the receiving party. Once the transfer conditions 142 have been completed, the status of the transfer conditions 142, as stored on the connector computing device 700, may be updated to "locked". The connector of the connector computing device 700 may communicate to the connector computing device 100, for example, communicating with the connector 110, that the connector computing device 700 has locked the transfer conditions 142, and may send the transfer conditions 142 with the added data to the connector 110.

Figure 7C:
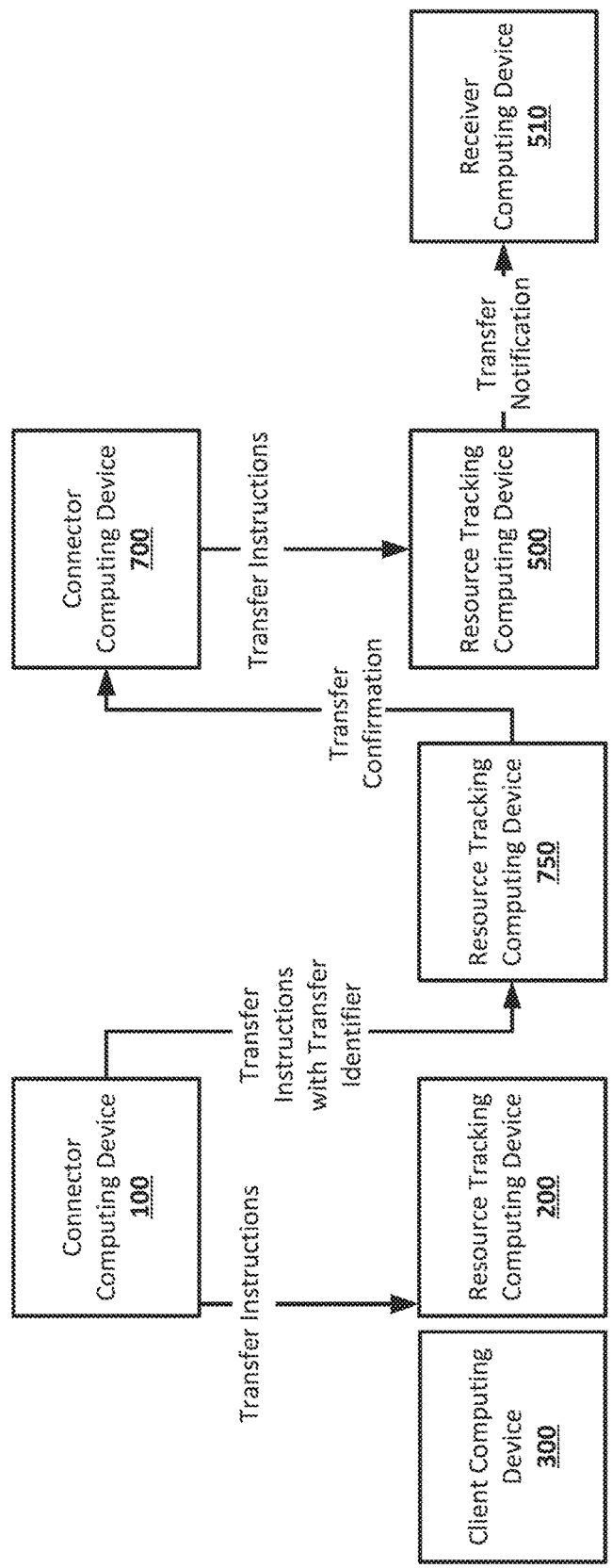
FIG. 7C shows an example arrangement suitable for resource transfer setup and verification according to an implementation of the disclosed subject matter.

FIG. 7C shows an example arrangement suitable for resource transfer setup and verification according to an implementation of the disclosed subject matter. Upon receiving a communication that the connector computing device 700 has locked the transfer conditions 142, the transfer coordinator 112 of the connector 110 may review the transfer conditions 142 sent back from the client connector 310, as updated with any additional data provided by the connector computing device 700, and may determine that the transfer conditions 142 are complete and have not been tampered with. For example, the transfer coordinator 112 may check the message authentication code that was included in the transfer conditions by the connector computing device 100 by generating a new message authentication code from the received transfer conditions 142 and comparing the new message authentication code to the message authentication code stored with the transfer conditions 142 by the connector computing device 100. If the new message authentication code matches the stored message authentication code, the transfer coordinator 112 may proceed with the transfer of resources specified in the transfer conditions 142. The status of the transfer conditions 142, as stored on the connector computing device 100, may be updated to "locked." The transfer coordinator 112 may send out, from the connector computing device 100, transfer instructions to both the resource tracking computing device 200 and the resource tracking computing device 750.

The resource tracking computing device 200 may include the origin resource pool for the transfer of resources and an intermediary resource pool. The intermediary resource pool may be controlled by, or associated with, a party that controls or is associated with the connector computing device 100. The transfer instructions sent to the resource tracking computing device 200 may be based on the origin sub-transfer stored in the transfer conditions 142. The resource tracking computing device 200 may execute the origin sub-transfer by transferring a specified amount of resources from the origin resource pool to the intermediary resource pool. The resource transferred may be the origin resource for the transfer of resources specified in the transfer conditions 142. The resource tracking computing device 200 may confirm the successful execution of the transfer to the connector computing device 100, for example, by sending a confirmation to the connector computing device 100. The connector computing device 100 may also query the resource tracking computing device 200 to determine when the origin sub-transfer has completed successfully. For example, the resource tracking computing device 200 may be the server system of a branch of a US bank that tracks the ledger of the branch. The connector computing device 100 may be a system belonging to the US bank, and may be in communication with the resource tracking computing device 200, for example, through the Internet, or through a private network belonging to the bank. The server system at the branch of the US bank may receive transfer instructions for an origin sub-transfer, and may transfer an amount of US dollars out of the origin resource pool, which may be an account controlled by the sending party, and into the destination resource pool, which may be an account controlled by the bank, on the ledger of the branch of the US bank.

The resource tracking computing device 750 may include two intermediary resource pools for the transfer of resources. A first intermediary resource pool on the resource tracking computing device 750 may be controlled by, or associated with, a party that controls or is associated with the connector computing device 100. A second intermediary resource pool on the resource tracking computing device 750 may be controlled by, or associated with, a party that controls or is associated with the connector computing device 700. The transfer instructions sent to the resource tracking computing device 750 may be based on the intermediate sub-transfer stored in the transfer conditions 142. The resource tracking computing device 750 may execute the intermediate sub-transfer by transferring a specified amount of resources from the first intermediary resource pool to the second intermediary resource pool. The resource transferred may be the intermediate resource for the transfer of resources specified in the transfer conditions 142. The resource tracking computing device 750 may confirm the successful execution of the transfer to the connector computing device 100, for example, by sending a confirmation to the connector computing device 100. The connector computing device 100 may also query the resource tracking computing device 500 to determine when the intermediate sub-transfer has completed successfully. The resource tracking computing device 750 may also confirm the successful execution of the transfer to the connector computing device 700, for example, by sending a confirmation to the connector computing device 700. The connector computing device 700 may also query the resource tracking computing device 750 to determine when the intermediate sub-transfer has completed successfully. For example, the resource tracking computing device 750 may be a server system that hosts a public ledger for a cryptocurrency. The first intermediary resource pool may be an account controlled by or associated with connector computing device 100, which may belong to the US bank, on the public cryptocurrency ledger. The second intermediary resource pool may be an account controlled by or associated with the connector computing device 700, which may belong to, for example, a European bank, on the public cryptocurrency ledger. The connector computing device 100 may be in communication with the resource tracking computing device 750, for example, through the Internet. The public cryptocurrency ledger may receive instructions the intermediate sub-transfer, and may transfer an amount of cryptocurrency out of the first intermediary resource pool, which may be controlled by the US bank, and into the second intermediary resource pool, which may be controlled by the European bank.

The connector computing device 700 may receive or otherwise obtain confirmation that the intermediate sub-transfer on the resource tracking computing device 750 was successful. The connector computing device 700 may then send transfer instructions for the destination sub-transfer to the resource tracking computing device 500. The resource tracking computing device 500 may include the destination resource pool for the transfer of resources and an intermediary resource pool that may be controlled by or associated with a party that controls or is associated with the connector computing device 700. The transfer instructions sent to the resource tracking computing device 500 may be based on the destination sub-transfer stored in the transfer conditions 142. The resource tracking computing device 500 may execute the destination sub-transfer by transferring a specified amount of resources from the intermediary resource pool be controlled by or associated with a party that controls or is associated with the connector computing device 700 to the destination resource pool. The resource transferred may be the destination resource for the transfer of resources specified in the transfer conditions 142. The resource tracking computing device 500 may confirm the successful execution of the transfer to the connector computing device 100, for example, by sending a confirmation to the connector computing device 100. The connector computing device 100 may also query the resource tracking computing device 500 to determine when the destination sub-transfer has completed successfully. For example, the resource tracking computing device 500 may be the server system of a French branch of European bank which controls or is associated with the second intermediary resource pool on the public cryptocurrency ledger of the resource tracking computing device 750. The connector computing device 700 may be a system belonging to the European bank, and may be in communication with the resource tracking computing device 500, for example, through the Internet, or through a private network belonging to the bank. The server system at the French branch of the European bank may receive transfer instructions for a destination sub-transfer, and may transfer an amount of Euros out of an intermediary resource pool, which may be an account controlled by the European bank, and into the destination resource pool, which may be an account controlled by the receiving party. The receiving party may receive a notification when the transfer of resource has been completed, for example, at the receiver computing device 510.

While the transfer of resources is in progress, the transfer conditions 142 may be updated based on the state of the sub-transfers and the overall transfer of resources. For example, the state of the transfer conditions 142 may be changed to "in progress" from "locked" while the transfer of resources is in progress, and to either "succeeded" or "failed" depending on the outcome of the transfer of resources. The origin sub-transfer, intermediate sub-transfer, and destination sub-transfer may have their own states, which may also be updated, for example, indicated whether each sub-transfer is "in progress", "succeeded", or "failed".

Figure 8A:
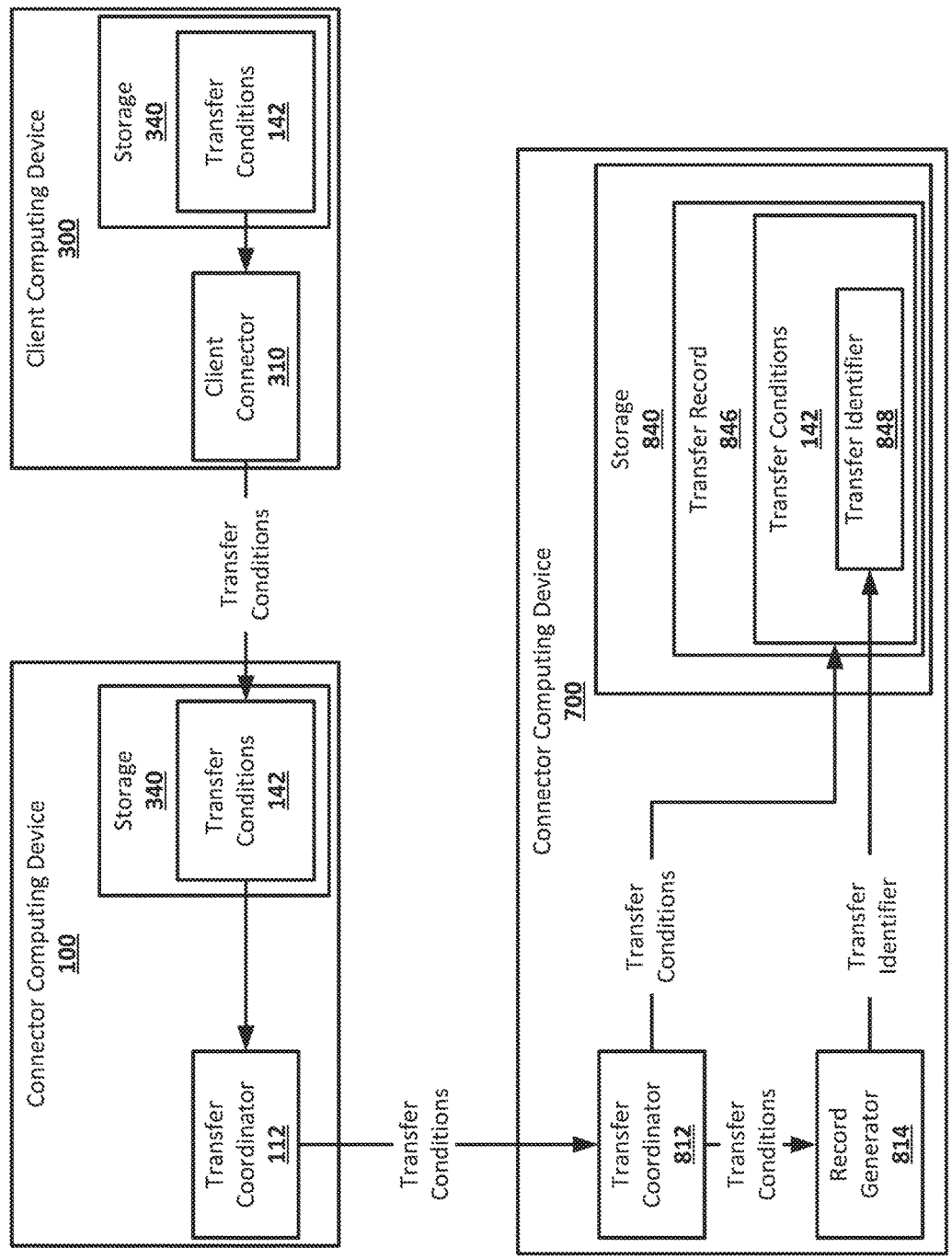
FIG. 8A shows an example arrangement suitable for resource transfer setup and verification according to an implementation of the disclosed subject matter.

FIG. 8A shows an example arrangement suitable for resource transfer setup and verification according to an implementation of the disclosed subject matter. The connector computing device 700 may receive the transfer conditions 142, selected and accepted by the client connector 310 of the client computing device 300, from the transfer coordinator 112 of the connector computing device 100. A transfer coordinator 812, which may be similar to the transfer coordinator 112, of the connector computing device 700 may generate and store the transfer identifier 848 for the transfer conditions 142. For example, the transfer coordinator 812 may send the transfer conditions 142 to a record generator 814, which may similar to the record generator 114. The record generator 814 may generate the transfer identifier 848 in any suitable manner. For example, the record generator 814 may retrieve data from any suitable fields of the transfer conditions 142, such as any fields related to the origin sub-transfer and destination sub-transfer, represent the data as single value, hash the single value into a hexadecimal string, and trim the hexadecimal string to 64 characters, generating the transfer identifier 848. The transfer identifier 848 may be included in the transfer conditions 142. On successful completion of the transfer of resources specified by the transfer conditions 142, the transfer conditions 142 with the transfer identifier 848 may be stored as a transfer record 846 in a storage 840, which may similar to the storage 140. In some implementations, the transfer conditions 142 may also be stored as the transfer record 846 when the transfer of resources fails. The connector computing device 700 may maintain a database of transfer records, such as the transfer record 846. The database may be stored locally or remotely, for example, on a storage server system accessible to the connector computing device 700.

Figure 8B:
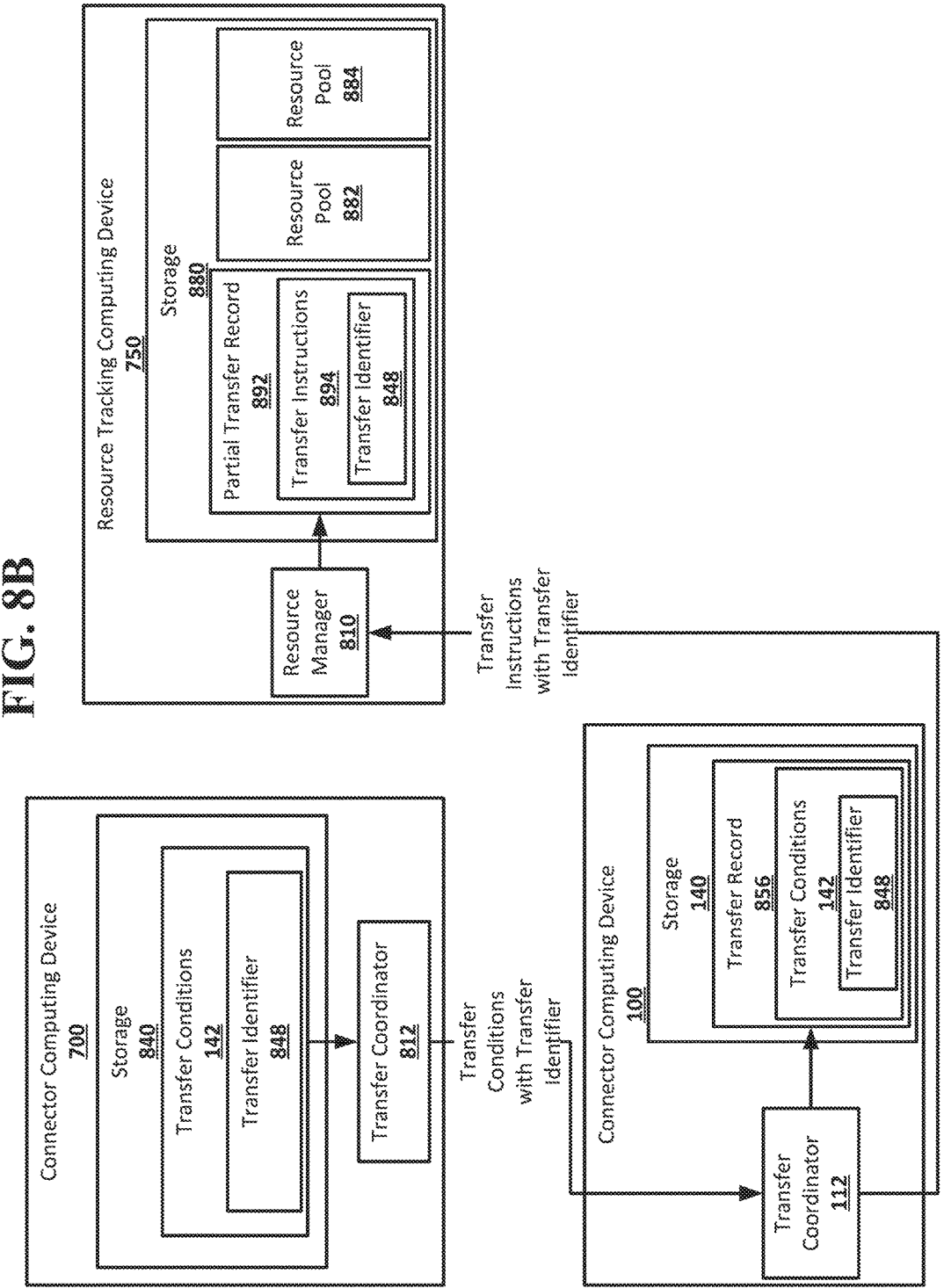
FIG. 8B shows an example arrangement suitable for resource transfer setup and verification according to an implementation of the disclosed subject matter.

FIG. 8B shows an example arrangement suitable for resource transfer setup and verification according to an implementation of the disclosed subject matter. The connector computing device 700 may send the transfer identifier 848 to the connector computing device 100. For example, after the connector computing device 700 accepts and locks the transfer conditions 142 received from the connector computing device 100 and generates the transfer identifier 848, the transfer coordinator 812 may send the transfer identifier 848 to the transfer coordinator 112. The transfer coordinator 812 may also send the transfer conditions 142 back to the transfer coordinator 112 of the connector computing device 100, for example, if the transfer coordinator 812 gathered additional data for the transfer conditions 142. The transfer conditions 142 and the transfer identifier 848 may be stored in the storage 840, though may not yet be stored as part of the transfer record 846. The connector computing device 100 may store the transfer conditions 142 and the transfer identifier 848 in the storage 140. When the transfer of resource has completed successfully, the transfer record 856 may be created in the storage 140, storing the transfer conditions 142 and transfer identifier 848. In some implementations, the transfer conditions 142 may also be stored as the transfer record 856 when the transfer of resources fails. The connector computing device 100 may maintain a database of transfer records, such as the transfer record 856. The database may be stored locally or remotely, for example, on a storage server system accessible to the connector computing device 700.

The connector computing device 100 may send the transfer identifier 848 to the resource tracking computing device 750. For example, when the transfer coordinator 112 sends the transfer instructions for the intermediate sub-transfer to the resource tracking computing device 750, the transfer coordinator 112 may also send the transfer identifier 848 to the resource tracking computing device 750. The resource manager 810, which may be similar to the resource manager 210, may execute the intermediate sub-transfer based on the transfer instructions, for example, transferring resources out of a resource pool 882 and into a resource pool 884, and may store the received transfer instructions as transfer instructions 894 in a partial transfer record 892 in a storage 880, which may be similar to the storage 140. The partial transfer record 892 may also include the transfer identifier 848. The resource tracking computing device 750 may not receive the entirety of the transfer conditions 142, which may include identifying information for both the sending party and receiving party for the transfer of resources. This may prevent the identities of the sending party and the receiving party for the transfer of resources conducted according the transfer conditions 142 from being publicly available, for example, when the resource tracking system 750 is a public ledger, such a centralized public ledger for a cryptocurrency. The partial transfer record 892 may only be usable to directly identify parties which control or are associated with the resource pools 882 and 884 of the intermediate sub-transfer. This may allow a party with suitable authority to discover the identities of the sending party and the receiving party by, for example, asking the parties which control or are associated with the resource pools 882 and 884 to provide the transfer instructions 142 for the transfer identifier 848 as retrieved from the storage 880. For example, the transfer instructions 894 may be used to identify the party that controls or is associated with the resource pool 882 as the party that controls or is associated with the connector computing device 100. The party that controls or is associated with the connector computing device 100 may be requested to locate and provide a transfer record stored on the connector computing device 100 that includes the transfer identifier 848. The party that controls or is associated with the connector computing device 100 may determine that the transfer record 856 include the transfer identifier 848, and may provide the transfer record 856 to the requestor, which may then use the transfer conditions 142 to identify the sending party and the receiving party for the transfer of resources that included the intermediate sub-transfer executed according to the transfer instructions 894. The transfer record 846 may be obtained similarly from the connector computing device 700.

Figure 9:
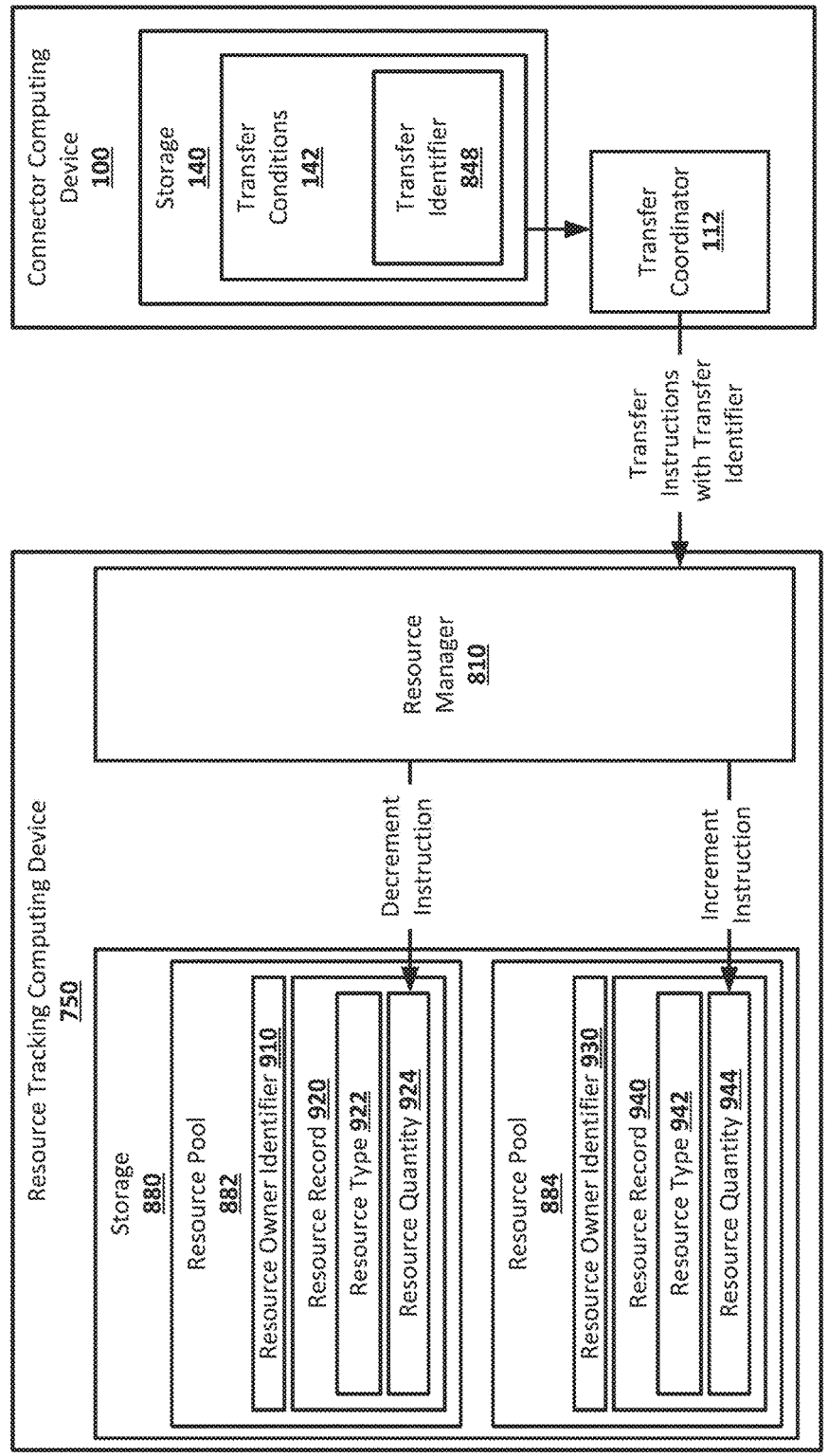
FIG. 9 shows an example arrangement suitable for resource transfer setup and verification according to an implementation of the disclosed subject matter.

FIG. 9 shows an example arrangement suitable for resource transfer setup and verification according to an implementation of the disclosed subject matter. The connector computing device 100 may send transfer instructions for the intermediate sub-transfer specified in the transfer conditions 142 to the resource tracking computing device 750. The transfer instructions may cause the resource tracking computing device 750 to effect the intermediate sub-transfer, transferring resources from the resource pool 882 to the resource pool 884. The resource manager 810 may decrement a resource quantity 924, in the resource pool 882, by a quantity specified in the transfer instructions, and increment a resource quantity 944, in the resource pool 884, by that same quantity. Resource types 922 and 942 may be the same. For example, the resource types 922 and 942 may indicate that the resource pools 882 and 884 include quantities of a cryptocurrency. This may result in the resource pool 884 recording that the party identified by the resource owner identifier 930, which may be, for example, the party that controls or is associated with the connector computing device 700, controls an increased quantity of the resource type 942. The resource pool 882 may record that the party identified by the resource owner identifier 910, for example, the party that controls or is associated with the connector computing device 100, controls a decreased quantity of the resource type 922. The total quantity of the resource type 922 or 942 tracked by the resource tracking computing device 750 may not have changed, only the quantities of the resource as recorded by resource records 920 and 940 for the resource pools 882 and 884 may have changed.

The resource quantities 924 and 944 may be counters stored in registers or memory cells. When the resource quantity 924 is decremented, the quantity recorded by the counter may be decreased by the quantity specified in the transfer instructions received from the transfer coordinator 112. The resource quantities 924 and 944 may also include locations or other identifiers for specific resources, such as those with physical instantiations such as commodities or block of memory, or financial instruments or other resources that may be individually distinguishable. This may allow the transfer of specific resources, such as specific commodities stored at specific locations, specific shares of stock, specific bonds, specific contracts such as, for example options contracts, and so on.

Figure 10:
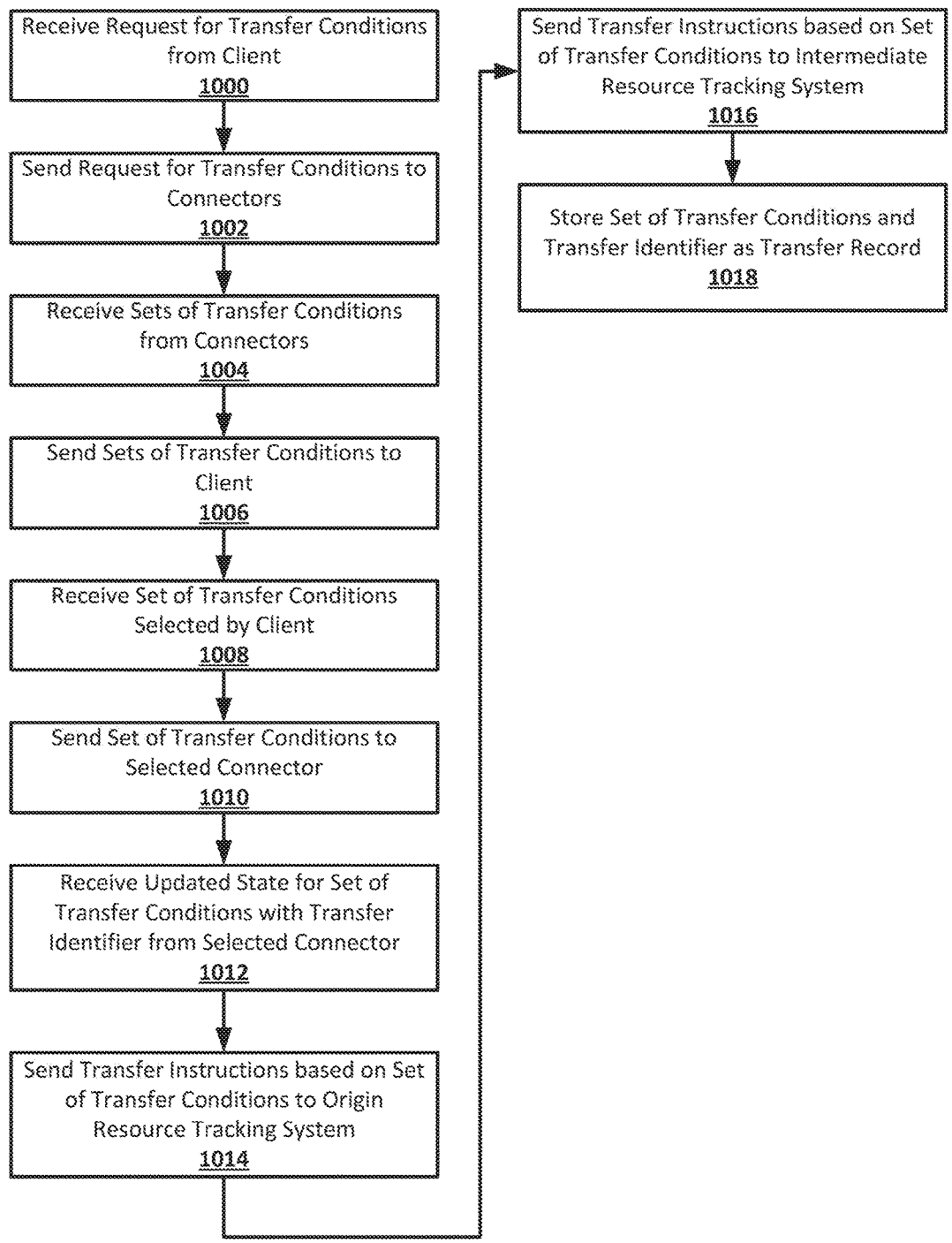
FIG. 10 shows an example procedure suitable for a resource transfer setup and verification according to an implementation of the disclosed subject matter.

FIG. 10 shows an example procedure suitable for a resource transfer setup and verification according to an implementation of the disclosed subject matter. At 1000, a request for transfer conditions may be received. For example, a request for transfer conditions from the client connector 310 of the client computing device 300 may be received by the connector 110 of the connector computing device 100. The request for transfer conditions may include any suitable data in any suitable format. For example, the request for transfer conditions may include an identification of the destination resource pool, an identification of the origin resource pool, the amount and type of resource to be transferred into the destination resource pool, and optionally, an identification of one or more of the intermediary resources pools that may be used in the transfer of resources. The resource pools may be identified in any suitable manner, such as, for example, with a URI. The request for transfer conditions may be sent, for example, as an HTTP GET request, using any suitable communications hardware and software.

At 1002, the request for transfer conditions may be sent to connectors. For example, the transfer coordinator 112 of the connector 110 on the computing device 100 may determine from the request for transfer conditions that an additional resource tracking system, such as the resource tracking computing device 750, may be needed to complete the transfer of resources specified in the request for transfer conditions. The transfer coordinator 112 may send out the request for transfer conditions to other connectors, such as, for example, connectors of the connector computing devices 700, 710, and 720. The transfer coordinator may determine which connectors to send the request for transfer conditions to in any suitable manner.

At 1004, sets of transfer conditions may be received. For example, transfer coordinators of the connectors on connector computing devices that received the request for transfer conditions from the connector computing device 100 may generate a set of transfer conditions that may be sent back to the transfer coordinator 112 of the connector 110. For example, the connector computing device 700 may generate a first set of transfer conditions, the connector computing device 710 may generate a second set of transfer conditions, and the connector computing device 720 may generate a third set of transfer conditions. The first, second, and third sets of transfer conditions may be received at the connector computing device 100.

At 1006, the sets of transfer conditions may be sent to the client. For example, the transfer coordinator 112 may send any sets of transfer conditions received in response to the request for transfer conditions, such as the first, second, and third sets of transfer conditions, to the client computing device 300. The transfer coordinator 112 of the connector 110 may communicate with the client connector 310, for example, using HTTP to send an object, such as a JSON object. The sets of transfer conditions may each be in a "proposed" state.

At 1008, a set of transfer conditions selected by the client may be received. For example, the client connector 310 may select and accept one of the sets of transfer conditions, such as the transfer conditions 142, in any suitable manner. The selected set of transfer conditions, for example, the transfer conditions 142, may be sent back to the connector 110 on the connector computing device 100 by the client connector 310. The transfer conditions 142 may be sent in any suitable manner, such as, for example, using an HTTP POST of a data object such as a JSON object.

At 1010, the received set of transfer conditions may be sent to the selected connector. For example, the transfer coordinator 112 may send the received transfer conditions 142 to the connector that the generated the transfer conditions 142 that were selected by the client connector 310 on the client computing device 300. For example, the transfer conditions 142 may have been generated by the transfer coordinator of the connector on the connector computing device 700. The transfer coordinator 112 of the connector 110 may send the transfer conditions 142, as received from the client computing device 300, to the connector of the connector computing device 700, which may be the selected connector.

At 1012, an updated state and transfer identifier for the set of transfer conditions may be received. For example, the transfer coordinator of the connector on the connector computing device 700 may generate the transfer identifier 848 for the transfer conditions 142. The transfer identifier 148 may be sent to the connector computing device 100, for example, to the transfer coordinator 112 of the connector 110. The connector on the connector computing device 700 may also update the state of the transfer conditions 142, for example, to either "accepted" or "locked." The state may be communicated to the connector 110, for example with the transfer conditions 142, or separately. If the transfer conditions 142 are in an "accepted" state, the connector computing device 100 may wait until the state is updated to "locked" by the connector on the connector computing device 700, indicating that that the transfer of resources can proceed.

At 1014, transfer instructions may be sent to an origin resource tracking system. For example, the transfer coordinator 112 of the connector 110 on the connector computing device 100 may send transfer instructions for an origin sub-transfer specified in the transfer conditions 142 to the resource tracking computing device 200. The resource tracking computing device 200 may include the origin resource pool for the transfer of resources, and may be the origin resource tracking system for the transfer of resources. The origin sub-transfer may, for example, specify a transfer of resources, for example, the origin resource specified in the transfer conditions 142, from the origin resource pool to an intermediary resource pool. The origin resource pool may be controlled by or associated with a sending party for the transfer of resources that, for example, may control or be associated with the client computing device 300. The intermediary resource pool may be controlled or associated with a party that, for example, may control or be associated with the connector computing device 100.

At 1016, transfer instructions may be sent to an intermediate resource tracking system. For example, the transfer coordinator 112 of the connector 110 on the connector computing device 100 may send transfer instructions for an intermediate sub-transfer specified in the transfer conditions 142 to the resource tracking computing device 750. The resource tracking computing device 750 may include intermediary resource pools for the transfer of resources, and may be the intermediate resource tracking system for the transfer of resources. The intermediate sub-transfer may, for example, specify a transfer of resources, for example, the intermediate resource specified in the transfer conditions 142, from a first intermediary resource pool to a second intermediary resource pool. The first intermediary resource may be controlled by or associated with a party for the transfer of resources that, for example, may control or be associated with the connector computing device 100. The second intermediary resource pool may be controlled or associated with a party that, for example, may control or be associated with the connector computing device 700.

At 1018, the set of transfer conditions and the transfer identifier may be stored as the transfer record. For example, the connector computing device 100 may store the transfer record 856, which may include the transfer conditions 142 and the transfer identifier 848, in the storage 140. The transfer record 856 may be stored upon successful completion of the transfer of resources specified by the transfer conditions 142, or upon failure of the transfer of resources.

Figure 11:
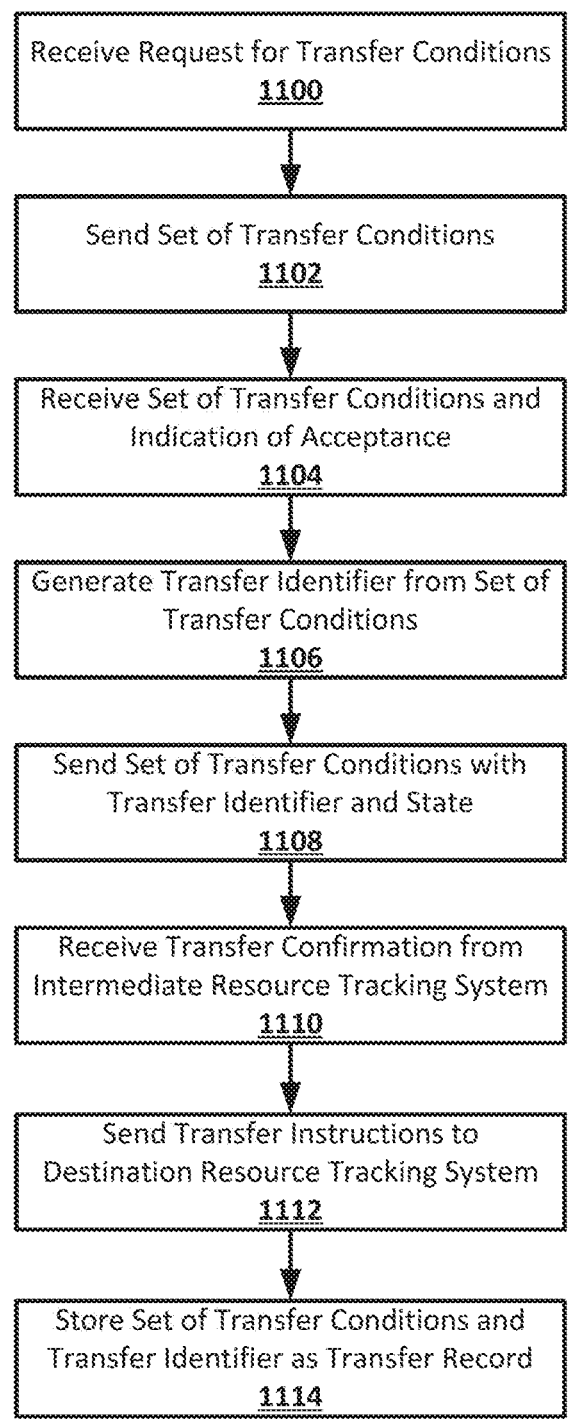
FIG. 11 shows an example procedure suitable for a resource transfer setup and verification according to an implementation of the disclosed subject matter.

FIG. 11 shows an example procedure suitable for a resource transfer setup and verification according to an implementation of the disclosed subject matter. At 1100 a request for transfer conditions may be received. For example, a request for transfer conditions from the connector 110 of the connector computing device 100 may be received by the connector of the connector computing device 700. The request for transfer conditions may include any suitable data in any suitable format. For example, the request for transfer conditions may include an identification of the destination resource pool, an identification of the origin resource pool, the amount and type of resource to be transferred into the destination resource pool, and optionally, an identification of one or more of the intermediary resources pools and additional resource tracking systems, such as the resource tracking computing device 750, that may be used in the transfer of resources. The resource pools may be identified in any suitable manner, such as, for example, with a URI. The request for transfer conditions may be sent, for example, as an HTTP GET request, using any suitable communications hardware and software.

At 1102, a set of transfer conditions may be sent. For example, a set of transfer conditions, such as the transfer conditions 142, may be generated on the connector computing device 700, for example, by the connector, in response to the received request for transfer conditions. The generated set of transfer conditions may be based on the received request for transfer conditions, and may include additional data that may specify, for example, an intermediate sub-transfer and destination sub-transfer. The specified intermediate sub-transfer may be a transfer of resources on the resource tracking computing device 750 from the party that controls or is associated with the connector computing device 100 to the party that controls or is associated with the connector computing device 700. The specified destination sub-transfer may be transfer of resources from the party that controls or is associated with the connector computing device 700 to the destination party specified in the request for transfer conditions. The generated set of transfer conditions, such as the transfer conditions 142, may be sent to the connector 110 on the connector computing device 100, in any suitable manner, such as, for example, using HTTP to send a data object, such as JSON object.

At 1104, a set of transfer conditions may be received with an indication that they have been accepted. For example, the connector on the connector computing device 700 may receive the transfer conditions 142 from the connector 110 on the connector computing device 100. The transfer conditions 142 may include an indication that they were accepted by the sending party, for example, through the client connector 310 on the client computing device 300, after being sent back from the connector computing device 700 to the connector computing device 100.

At 1106, a transfer identifier may be generated for the set of transfer conditions. For example, the record generator 814 may generate the transfer identifier 848 by taking specified values from the transfer conditions 142, representing the values as a single string, and generating a hash from the single string. The transfer identifier 848 may then be based on the generated hash in any suitable manner. For example, the transfer identifier 848 may be generated by record generator 814 by representing the hash as a hexadecimal string and trimming the hexadecimal string to 64 characters.

The specified values from the transfer conditions 142 may be any values pertaining to any sub-transfers that may be part of the transfer of resource, or any other suitable values included in the transfer conditions 142.

At 1108, the transfer conditions may be sent along with the transfer identifier and state. For example, the transfer coordinator of the connector on the connector computing device 700 may update the state of the transfer conditions 142 to "accepted" or "locked", depending on whether further data is needed to complete the transfer conditions 142. If no further data is needed, the state of the transfer conditions 142 may be changed to "locked," otherwise, if further data is needed, the state may be changed to "accepted." The state and the transfer identifier 848, may be sent from the connector on the connector computing device 700 to the connector 110 on the connector computing device 100, as the connector computing device 100 may already store its own copy of the transfer conditions 142. If the state is "accepted", the connector on the connector computing device 700 may obtain the additional data, add the additional data to the transfer conditions 142, update the state of the transfer conditions 142 to "locked", and send the transfer conditions 142, with the additional data and updated state, to the connector 110 on the connector computing device 100.

At 1110, a transfer confirmation may be received from an intermediate resource tracking system. For example, the connector computing device 700 may receive confirmation that the intermediate sub-transfer specified in the transfer conditions 142 has been successfully executed on the resource tracking computing device 750, which may be the intermediate resource tracking system for the transfer of resources. The connector computing device 700 may receive a message from the connector computing device 750 confirming the transfer, or may query the resource tracking computing device 750 to determine when the intermediate sub-transfer has completed successfully.

At 1112, transfer instructions may be sent to a destination resource tracking system. For example, after receiving confirmation of the successful execution of the intermediate sub-transfer on the resource tracking computing device 750, the transfer coordinator of the connector on the connector computing device 700 may send transfer instructions for a destination sub-transfer specified in the transfer conditions 142 to the resource tracking computing device 500. The resource tracking computing device 500 may include an intermediary resource pool controlled by or associated with the party that controls or is associated with the connector computing device 700 and the destination resource pool, and may be the destination resource tracking system for the transfer of resources. The destination sub-transfer may, for example, specify a transfer of resources, for example, the destination resource specified in the transfer conditions 142, from the intermediary resource pool to the destination resource pool.

At 1114, the set of transfer conditions and transfer identifier may be stored as a transfer record. For example, the connector computing device 700 may store the transfer record 846, which may include the transfer conditions 142 and the transfer identifier 848, in the storage 840. The transfer record 846 may be stored upon successful completion of the transfer of resources specified by the transfer conditions 142, or upon failure of the transfer of resources.

Figure 12:
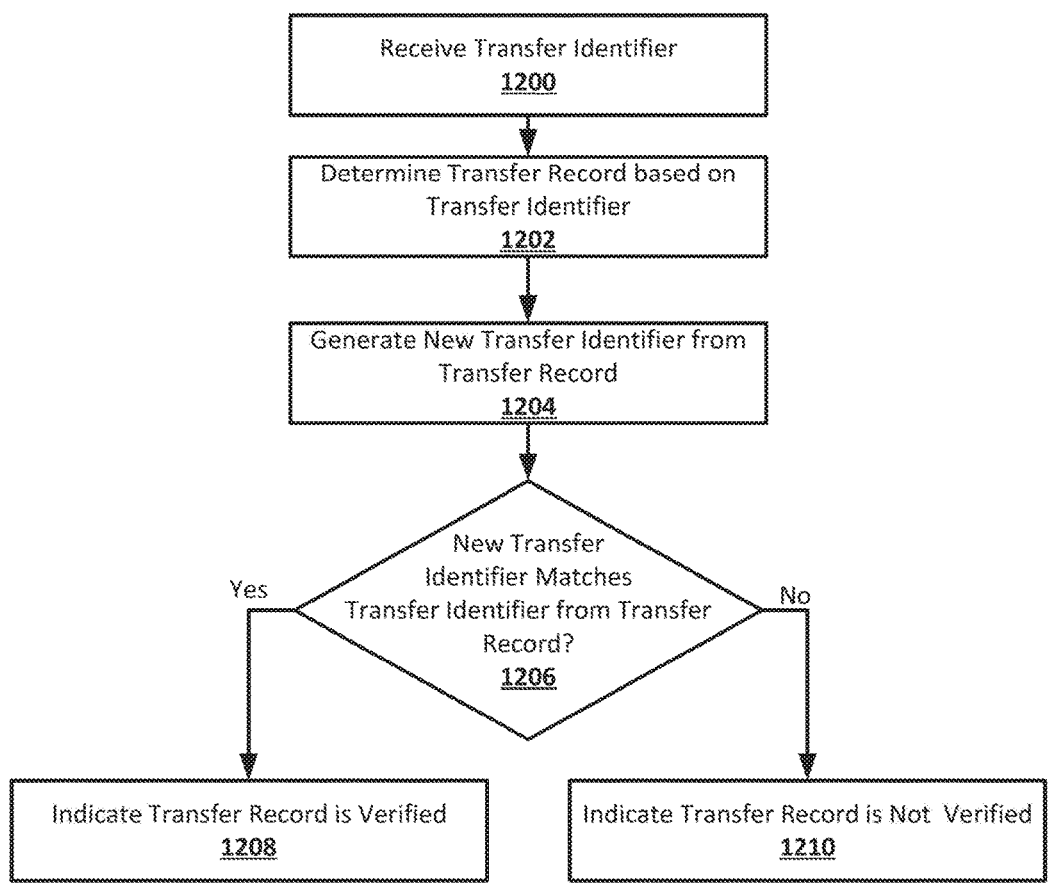
FIG. 12 shows an example procedure suitable for a resource transfer setup and verification according to an implementation of the disclosed subject matter.

FIG. 12 shows an example procedure suitable for a resource transfer setup and verification according to an implementation of the disclosed subject matter. At 1200, a transfer identifier may be received. For example, the connector computing device 100 may receive a transfer identifier, which may have been obtained from, for example, a partial transfer record, such as the partial transfer record 892, stored on resource tracking system that served as an intermediate resource tracking system, such as the resource tracking computing device 750.

At 1202, a transfer record may be determined based on the transfer identifier. For example, the connector computing device 100 may search the transfer records stored in the storage 140 to determine which transfer record includes a transfer identifier that matches the received transfer identifier. If no transfer record with a matching transfer identifier is found, the received transfer identifier may be erroneous, or a transfer identifier in the storage 140 may have been modified or deleted.

At 1204, a new transfer identifier may be generated from the transfer record. For example, the connector computing device 100 may determine that the transfer identifier 848 stored in the transfer record 856 matches the received transfer identifier. The record generator 114 of the connector 110 on the connector computing device 100 may generate a new transfer identifier using data from the transfer conditions 142 as stored in the storage 140 as part of the transfer record 856. The new transfer identifier may be generated in the same manner that the transfer identifier 848 was generated, using the same data from the transfer conditions 142.

At 1206, whether the new transfer identifier matches the transfer identifier from the transfer record may be determined. For example, the new transfer identifier may be compared to the transfer identifier 848 from the transfer record 856, which may also be identical to the received transfer identifier. If the new transfer identifier matches the transfer identifier from the transfer record, the transfer record may be verified at 1208. If the new transfer record does not match the transfer identifier from the transfer record, the transfer record may not be verified at 1210.

At 1208, the transfer record may be verified. For example, the new transfer identifier generated based on data from the transfer conditions 142 may have matched the transfer identifier 848 stored with the transfer conditions 142 in the transfer record 856. This may indicate that the transfer record 856, and the transfer conditions 142, have not been tampered with or modified since the transfer identifier 848 was generated and the transfer record 856 was stored in the storage 140. Additional verification of the transfer record 856 and the transfer conditions 142 may be obtained by, for example, attempting verification of the transfer record 846, which includes the transfer identifier 848, in the storage 840 of the connector computing device 700 in a similar manner. If the transfer conditions 142 as stored in transfer record 846 in the storage 840 can be used to generate a new transfer identifier that also matches the transfer identifier 848, this may further indicate that the transfer conditions 142 have not been tampered with or modified since being stored in either the storage 140 or the storage 840.

At 1210, the transfer record may not be verified. For example, the new transfer identifier generated based on data from the transfer conditions 142 may not have matched the transfer identifier 848 stored with the transfer conditions 142 in the transfer record 856. This may indicate that the transfer record 856, and the transfer conditions 142, may have been tampered with or modified since the transfer identifier 848 was generated and the transfer record 856 was stored in the storage 140. Failure to verify the transfer record 856 may result in any suitable action, including, for example, notification of the failure being sent from the connector computing device 100 to any suitable device or system in order to notify any suitable party.

Figure 13:
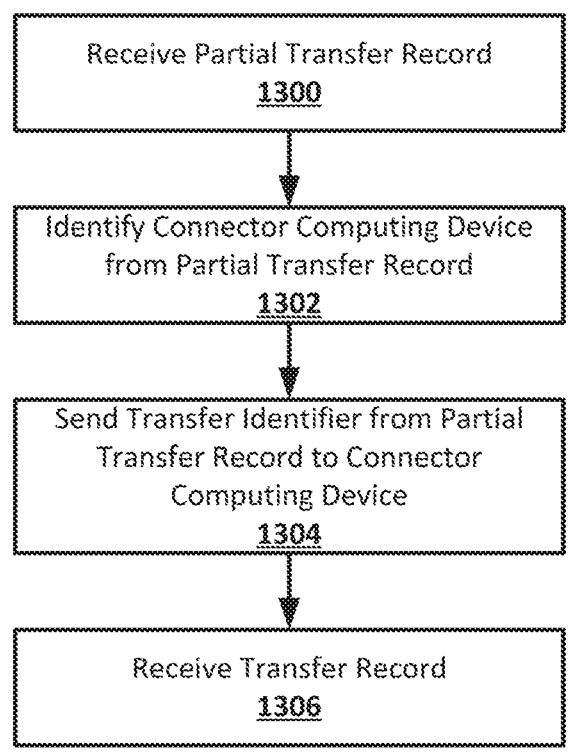
FIG. 13 shows an example procedure suitable for a resource transfer setup and verification according to an implementation of the disclosed subject matter.

FIG. 13 shows an example procedure suitable for a resource transfer setup and verification according to an implementation of the disclosed subject matter. At 1300, a partial transfer record may be received. For example, any suitable party, using any suitable computing device or system, may request and receive a partial transfer record, for example, the partial transfer record 892, from a resource tracking system, for example, the resource tracking computing device 750, which may have served as the intermediate resource tracking system for a transfer of resources.

At 1302, a connector computing device may be identified from the partial transfer record. For example, the partial transfer record 892 may include the transfer instructions 894. The transfer instructions 894 may include identifiers, such as URIs, for resource pools on the resource tracking computing device 750 that were used for the intermediate sub-transfer of a transfer of resources. The transfer instruction 894 may include identifying information for both of the parties that control or are associated with these resource pools on the resource tracking computing device 750. The identifying information may be used to determine the connector computing devices, for example, the connector computing devices 100 and 700, which are controlled by or associated with the parties that also control or are associated with the resource pools that were used in the intermediate sub-transfer as specified in the transfer instructions 894. The transfer instructions 894 may also include data directly identifying the connector computing devices in addition to or in lieu of identifying information for the parties that control or are associated with the connector computing devices. For example, the transfer instructions 894 may include URIs, MAC addresses, IP addresses, or other suitable data that directly identifies the connector computing devices.

At 1304, a transfer identifier from the partial transfer record may be sent to the identified connector computing device. For example, the partial transfer record 892 may include the transfer identifier 848. The transfer identifier 848 may be sent to the connector computing device 100 or the connector computing device 700, which may have been identified from the transfer instructions 894. The sending of the transfer identifier 848 may be a request for a transfer record that includes the transfer identifier 848.

At 1306, a transfer record may be received. For example, the connector computing device 100 may receive the transfer identifier 848, determine that the transfer record 856 in the storage 140 includes the matching transfer identifier 848, and send out the transfer record 856. The received transfer record 856 may then be used to determine any suitable aspect of the transfer of resources as specified in the transfer conditions 142 that was not determinable from the partial transfer record 892 along. For example, the transfer conditions 142 may be used to determine the identities of the sending party and the receiving party for the transfer of resource specified in the transfer conditions 142, which may not have been determinable from the partial transfer record 892 alone, as the transfer instructions 894 may have included no identifying data for the sending party or the receiving party.

Embodiments of the presently disclosed subject matter may be implemented in and used with a variety of component and network architectures. FIG. 14 is an example computer system 20 suitable for implementing embodiments of the presently disclosed subject matter. The computer 20 includes a bus 21 which interconnects major components of the computer 20, such as one or more processors 24, memory 27 such as RAM, ROM, flash RAM, or the like, an input/output controller 28, and fixed storage 23 such as a hard drive, flash storage, SAN device, or the like. It will be understood that other components may or may not be included, such as a user display such as a display screen via a display adapter, user input interfaces such as controllers and associated user input devices such as a keyboard, mouse, touchscreen, or the like, and other components known in the art to use in or in conjunction with general-purpose computing systems.

The bus 21 allows data communication between the central processor 24 and the memory 27. The RAM is generally the main memory into which the operating system and application programs are loaded. The ROM or flash memory can contain, among other code, the Basic Input-Output system (BIOS) which controls basic hardware operation such as the interaction with peripheral components. Applications resident with the computer 20 are generally stored on and accessed via a computer readable medium, such as the fixed storage 23 and/or the memory 27, an optical drive, external storage mechanism, or the like.

Each component shown may be integral with the computer 20 or may be separate and accessed through other interfaces. Other interfaces, such as a network interface 29, may provide a connection to remote systems and devices via a telephone link, wired or wireless local- or wide-area network connection, proprietary network connections, or the like. For example, the network interface 29 may allow the computer to communicate with other computers via one or more local, wide-area, or other networks, as shown in FIG. 15.

Many other devices or components (not shown) may be connected in a similar manner, such as document scanners, digital cameras, auxiliary, supplemental, or backup systems, or the like. Conversely, all of the components shown in FIG. 14 need not be present to practice the present disclosure. The components can be interconnected in different ways from that shown. The operation of a computer such as that shown in FIG. 14 is readily known in the art and is not discussed in detail in this application. Code to implement the present disclosure can be stored in computer-readable storage media such as one or more of the memory 27, fixed storage 23, remote storage locations, or any other storage mechanism known in the art.

Figure 15:
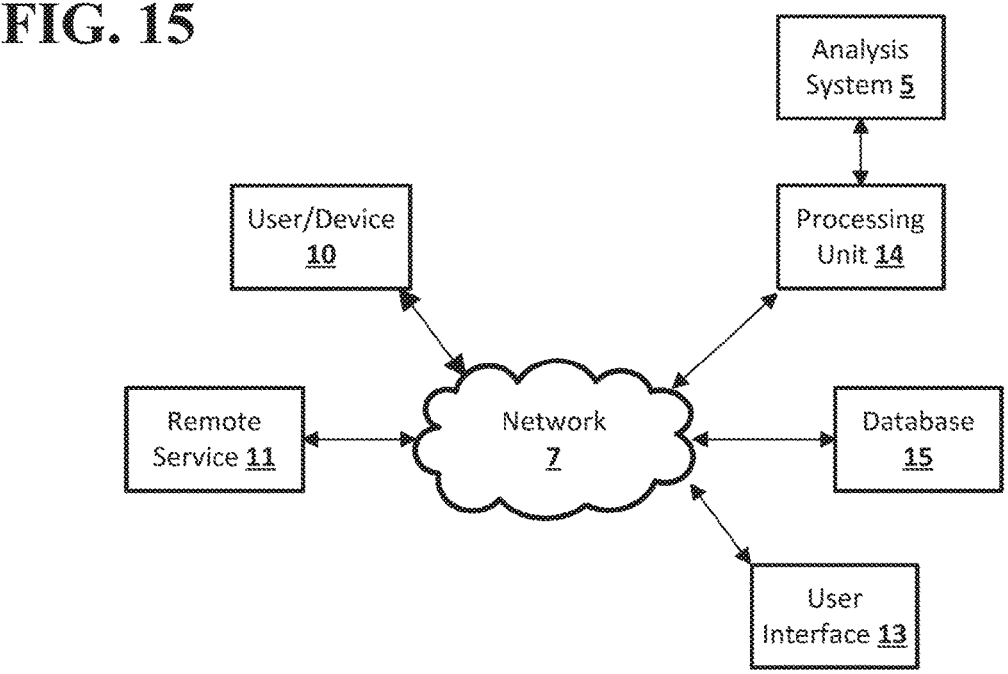
FIG. 15 shows a network configuration according to an embodiment of the disclosed subject matter.

FIG. 15 shows an example arrangement according to an embodiment of the disclosed subject matter. One or more clients 10, 11, such as local computers, smart phones, tablet computing devices, remote services, and the like may connect to other devices via one or more networks 7. The network may be a local network, wide-area network, the Internet, or any other suitable communication network or networks, and may be implemented on any suitable platform including wired and/or wireless networks. The clients 10, 11 may communicate with one or more computer systems, such as processing units 14, databases 15, and user interface systems 13. In some cases, clients 10, 11 may communicate with a user interface system 13, which may provide access to one or more other systems such as a database 15, a processing unit 14, or the like. For example, the user interface 13 may be a user-accessible web page that provides data from one or more other computer systems. The user interface 13 may provide different interfaces to different clients, such as where a human-readable web page is provided to web browser clients 10, and a computer-readable API or other interface is provided to remote service clients 11. The user interface 13, database 15, and processing units 14 may be part of an integral system, or may include multiple computer systems communicating via a private network, the Internet, or any other suitable network. Processing units 14 may be, for example, part of a distributed system such as a cloud-based computing system, search engine, content delivery system, or the like, which may also include or communicate with a database 15 and/or user interface 13. In some arrangements, an analysis system 5 may provide back-end processing, such as where stored or acquired data is pre-processed by the analysis system 5 before delivery to the processing unit 14, database 15, and/or user interface 13. For example, a machine learning system 5 may provide various prediction models, data analysis, or the like to one or more other systems 13, 14, 15.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

The invention claimed is:

1. A computer-implemented method performed on a data processing apparatus comprising:
   receiving, by a connector computing device, from a first computing device, a request for transfer conditions for a transfer of resources from a sending party to a receiving party;
   generating, by the connector computing device, a set of transfer conditions in response to the request for transfer conditions;
   sending, by the connector computing device, the set of transfer conditions to the first computing device;
   receiving, by the connector computing device, from the first computing device, the set of transfer conditions and an indication of an acceptance of the set of transfer conditions by a second computing device;
   generating, by the connector computing device, a transfer identifier for the set of transfer conditions from data from the set of transfer conditions, the data comprising at least data specifying a first sub-transfer;
   sending, by the connector computing device, transfer instructions to a third computing device, the transfer instructions comprising instructions for the first sub-transfer specified in the set of transfer conditions, wherein the first sub-transfer of the transfer instructions comprises an indication of a first resource pool on the third computing device, a second resource pool on the third computing device, a resource type, and a resource amount;
   storing, by the connector computing device, the set of transfer conditions with the transfer identifier as a transfer record in non-volatile storage;
   receiving, by the connector computing device, a request to verify the transfer record, the request comprising the transfer identifier;
   generating, by the connector computing device, a new transfer identifier from the data from the set of transfer conditions stored in the transfer record with the transfer identifier;
   comparing, by the connector computing device, the new transfer identifier to the transfer identifier stored with the set of transfer conditions in the transfer record; and
   if the new transfer identifier matches the transfer identifier, sending, by the connector computing device, an indication that the transfer record is verified, or if the new transfer identifier does not match the transfer identifier, sending, by the connector computing device, an indication that the transfer record is not verified.

2. The method of claim 1, wherein generating a transfer identifier for the set of transfer conditions from data from the set of transfer conditions comprises:
   representing the data from the set of transfer conditions as a string;
   hashing the string to generate a hash value; and
   representing the hash value as a hexadecimal string.

3. The method of claim 1, wherein the first resource pool and the second resource pool are indicated by a uniform resource identifier (URI).

4. The method of claim 1, wherein generating the set of transfer conditions further comprises:
   generating a message authentication code based on a portion of data from the set of transfer conditions; and
   storing the message authentication code in the set of transfer conditions.

5. The method of claim 4, further comprising, after receiving, from the first computing device, the set of transfer conditions and an indication of an acceptance of the set of transfer conditions by a second computing device:
   generating a new message authentication code from the portion of data from the set of transfer conditions; and
   comparing the new message authentication code to the message authentication code stored in the set of transfer conditions to verify the set of transfer conditions before generating the transfer identifier.

6. The method of claim 1, wherein the set of transfer conditions is stored as a data object.

7. The method of claim 6, wherein the data object is sent and received using HTTP.

8. A computer-implemented method performed on a data processing apparatus comprising:
   receiving, by a connector computing device, from a first computing device, a request for transfer conditions for a transfer of resources from a sending party to a receiving party;
   sending, by the connector computing device, the request for transfer conditions to a second computing device;
   receiving, by the connector computing device, from the second computing device, a set of transfer conditions;
   sending, by the connector computing device, the set of transfer conditions to the first computing device;
   receiving, by the connector computing device, from the first computing device, the set of transfer conditions and an indication of an acceptance of the set of transfer conditions by the first computing device;
   sending, by the connector computing device, the set of transfer conditions and the indication of the acceptance by the first computing device to the second computing device;
   receiving, by the connector computing device, from the second computing device, an indication of acceptance of the set of transfer conditions by the second computing device and a transfer identifier for the set of transfer conditions;
   sending, by the connector computing device, first transfer instructions to a third computing device, the first transfer instructions comprising instructions for a first sub-transfer specified in the set of transfer conditions, wherein the first sub-transfer of the first transfer instructions comprises an indication of a first resource pool on the third computing device, a second resource pool on the third computing device, a first resource type, and a first resource amount;

sending, by the connector computing device, second transfer instructions and the transfer identifier to a fourth computing device, the second transfer instructions comprising instructions for a second sub-transfer specified in the set of transfer conditions, wherein the sub transfer of the second transfer instructions comprises an indication of a third resource pool on the fourth computing device, a fourth resource pool on the fourth computing device, a second resource type different from the resource type, a second resource amount;

storing, by the connector computing device, the set of transfer conditions with the transfer identifier as a transfer record in non-volatile storage;

receiving, by the connector computing device, a request to verify the transfer record, the request comprising the transfer identifier;

generating, by the connector computing device, a new transfer identifier from the data from the set of transfer conditions stored in the transfer record with the transfer identifier;

comparing, by the connector computing device, the new transfer identifier to the transfer identifier stored with the set of transfer conditions in the transfer record; and if the new transfer identifier matches the transfer identifier, sending, by the connector computing device, an indication that the transfer record is verified, or if the new transfer identifier does not match the transfer identifier, sending, by the connector computing device, an indication that the transfer record is not verified.

9. The method of claim 8, wherein the first resource pool, second resource pool, third resource pool, and fourth resource pool are indicated by a uniform resource identifier (URI).

10. The method of claim 8, further comprising, before sending the request for transfer conditions to a second computing device:

generating a message authentication code based on a portion of data from the set of transfer conditions; and storing the message authentication code in the set of transfer conditions.

11. The method of claim 10, further comprising, receiving, from the first computing device, the set of transfer conditions and an indication of an acceptance of the set of transfer conditions by the first computing device:

generating a new message authentication code from the portion of data from the set of transfer conditions; and comparing the new message authentication code to the message authentication code stored in the set of transfer conditions to verify the set of transfer conditions before sending the set of transfer conditions to the second computing device.

12. The method of claim 8, wherein the set of transfer conditions is stored as a data object.

13. The method of claim 12, wherein the data object is sent and received using HTTP.

\* \* \* \* \*